United States Patent
Uetsuka

(10) Patent No.: US 11,635,501 B2
(45) Date of Patent: Apr. 25, 2023

(54) CIRCULAR POLARIZATION-TYPE POLARIZATION DIVERSITY ELEMENT, SCANNING ELEMENT USING SAME, AND LIDAR

(71) Applicant: NATIONAL INSTITUTE OF ADVANCED INDUSTRIAL SCIENCE AND TECHNOLOGY, Tokyo (JP)

(72) Inventor: Hisato Uetsuka, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 409 days.

(21) Appl. No.: 16/650,440

(22) PCT Filed: Sep. 28, 2018

(86) PCT No.: PCT/JP2018/036281
§ 371 (c)(1),
(2) Date: Mar. 25, 2020

(87) PCT Pub. No.: WO2019/065975
PCT Pub. Date: Apr. 4, 2019

(65) Prior Publication Data
US 2020/0300992 A1    Sep. 24, 2020

(30) Foreign Application Priority Data
Sep. 28, 2017   (JP) .............................. JP2017-187801

(51) Int. Cl.
*G01S 7/499*   (2006.01)
*G02B 5/30*   (2006.01)
(Continued)

(52) U.S. Cl.
CPC ............ *G01S 7/499* (2013.01); *G01S 7/4817* (2013.01); *G01S 17/89* (2013.01); *G02B 5/3025* (2013.01); *G02B 26/101* (2013.01)

(58) Field of Classification Search
CPC ........ G01S 7/499; G01S 7/4817; G01S 17/89; G01S 7/4814; G01S 7/4917; G01S 17/10;
(Continued)

(56) References Cited

U.S. PATENT DOCUMENTS

| 5,006,721 A | 4/1991 | Cameron et al. |
| 2007/0024849 A1* | 2/2007 | Carrig ................... G01N 21/21 356/337 |

(Continued)

FOREIGN PATENT DOCUMENTS

| JP | 4-339274 A | 11/1992 |
| JP | 6-18940 A | 1/1994 |

(Continued)

*Primary Examiner* — Mustak Choudhury
(74) *Attorney, Agent, or Firm* — Taro Yaguchi

(57) ABSTRACT

In the prior art, a scanning element used for Lidar in the self-driving car technology employed a mirror or the like continuously rotated by MEMS, and due to the inertia of the mirror or the like, the scanning element was suited for a raster scan that scans a scene in one stroke, but was incapable of discontinuous movement from one arbitrary point to another, and programmable scanning with an arbitrary frequency in an arbitrary pattern, as fast as the raster scan. In the present invention, there was fabricated Lidar, which is composed of a polarization diversity scheme and a scanning element, wherein the polarization diversity scheme uses two polarization gratings, each polarization grating having a thickness such that it becomes a half-wave plate, wherein birefringent directors of each polarization grating rotate with a period Λ, wherein these polarization gratings are disposed with a desired interval from each other, wherein a half-wave plate is inserted in either one of two paths of
(Continued)

separated, exiting right-handed or left-handed circularly polarized light beam, depending on a rotation direction of the circularly polarized light, to thereby enable conversion of light beams into parallel proximate circularly polarized light beams with the same rotational direction, and wherein the scanning element has a multistage structure of polarization switch-polarization grating sets connected in combination, with a polarization switch and a polarization grating being defined as one set.

19 Claims, 22 Drawing Sheets

(51) Int. Cl.
    *G01S 7/481*      (2006.01)
    *G01S 17/89*      (2020.01)
    *G02B 26/10*      (2006.01)

(58) Field of Classification Search
    CPC ...... G01S 17/34; G01S 7/4812; G01S 17/931; G02B 5/3025; G02B 26/101; G02B 27/283; G02B 27/286; G02B 27/4261; G02F 1/29; G02F 1/1347; G02F 1/292; G02F 1/13476
    See application file for complete search history.

(56) References Cited

U.S. PATENT DOCUMENTS

| | | | |
|---|---|---|---|
| 2012/0188467 A1* | 7/2012 | Escuti | G02F 1/1347 349/1 |
| 2012/0236379 A1 | 9/2012 | da Silva et al. | |
| 2016/0018679 A1* | 1/2016 | Shiyanovskii | G02F 1/1393 349/33 |

FOREIGN PATENT DOCUMENTS

| | | | | |
|---|---|---|---|---|
| JP | 2003-302599 A | 10/2003 | | |
| JP | 2008-532085 A | 8/2008 | | |
| JP | 2010-060656 A | 3/2010 | | |
| JP | 2011-44204 A | 3/2011 | | |
| JP | 2016136165 A | * 7/2016 | ............. | G02B 27/48 |
| WO | 2014/181539 A1 | 11/2014 | | |
| WO | 2017/119362 A1 | 7/2017 | | |

* cited by examiner

Non-Resonant Mode

CIRCULAR POLARIZATION-TYPE POLARIZATION DIVERSITY ELEMENT, SCANNING ELEMENT USING SAME, AND LIDAR

FIELD OF THE INVENTION

The present invention relates to a circular polarization-type element and light beam digital scanning elements, and also to Lidar using these and a method for scanning.

BACKGROUND OF THE INVENTION

FIG. 1 is one embodiment example of polarization diversity as a conventional polarization control technology (Patent Document 1). After separating an incoming light into two orthogonal linearly polarized light beams with a polarizing beam splitter 102, one of the two light beams on one optical path is rotated by a polarization rotation element 107 thereby making the polarization of the light beams propagating on two optical paths the same (here, linearly polarized light beams oscillating vertically). However, although being effective for elements operating on linearly polarized light, this polarization diversity scheme may not be used for elements operating on circularly polarized light.

Meanwhile, FIG. 2 shows a configuration of Lidar using a MEMS mirror 8, which is a conventional scanning element. It is composed of a semiconductor laser 1, a lens 2, a light receiving element 3, a beam splitter 4 and the MEMS mirror 8, which is the scanning element. A light beam 6 emitted from the semiconductor laser 1 is converted to a desired light beam size through the lens 2, transmitted through the beam splitter 4, and then, reflected by the MEMS mirror 8 to scan an object 5 one-dimensionally (X-axis, Y-axis) or two-dimensionally (X-Y plane). Part of reflected light 7 from the object 5 is returned to the MEMS mirror 8, reflected by the beam splitter 4, converted into a desired spot size by the lens 2, and then, received by the light receiving element 3. Thus, the Lidar scans an outside world with a light beam and measures a distance from the object 5 in the outside world.

This configuration is referred to as a coaxial system, wherein the light beam 6 emitted from the semiconductor laser 1 and the reflected light 7 from the object 5 propagate on almost the same optical path from the object 5, on the MEMS mirror 8 and back to the beam splitter 4, and the reflected light 7 is received by the light receiving element 3. Accordingly, the light received at the light receiving element 3 may be limited approximately to the emitted and reflected light beam 6, therefore is characterized by not being affected by external light such as sunlight. However, since the reflected light 7 received is limited by an aperture of the MEMS mirror 8, it is difficult to obtain a high light power if the MEMS mirror 8 has a small area.

FIG. 3 shows a configuration of another conventional Lidar. This is called a "non-coaxial system," wherein light beams 6 emitted from a semiconductor laser 1 and reflected light beams 7 back from an object 5 propagate on different optical paths, respectively. Because this scheme has different optical systems for its transmitting and receiving sides, this scheme is not limited by an aperture of a MEMS mirror 8, and therefore, may receive greater light power by enlarging an aperture for a lens 2 in front of a light receiving element 3. However, this scheme is susceptible to external light such as sunlight and its S/N ratio (signal-to-noise ratio) is compromised during the daytime.

Also, in the conventional Lidar configurations, shown in FIG. 2 and FIG. 3, or a Lidar configuration described next (Patent Document 2), fine adjustments are required for assembly of optical axes and the like, making these configurations unsuited to mass production. Moreover, in general properties of the semiconductor laser 1 and the light receiving element 3 among others degrade at high temperatures; in the case of the semiconductor laser 1, its light power diminishes extremely. When such Lidar is mounted on a vehicle, it is desirable to mount the Lidar on top of the vehicle in order to irradiate light beams over long distances, but the vehicle top often becomes very hot, making it difficult to mount the Lidar thereon.

Meanwhile, in order to use Lidars for automated driving and the like, objects in the outside world need to be scanned two-dimensionally with light beams, as discussed above. To date, various light beam scanning methods have been reported. Patent Document 2, being one such example, enables two-dimensional scanning by combining a polygon mirror for one-dimensional scanning and a galvanometer mirror. In addition, Lidar of a two-dimensional scanning scheme using a MEMS mirror is reported in Patent Document 3.

For a scanner, polygon mirrors, galvanometer mirrors, MEMS mirrors, resonant bulk mirrors, etc. are reported. A polygon mirror or a galvanometer mirror drives a mirror using a motor, and a resonant bulk mirror oscillates at a resonant frequency of the bulk mirror. Also, a MEMS mirror drives a small mirror formed by micro-fabrication with the electrostatic, electromagnetic or piezoelectric effect, etc. Here, MEMS mirror scanning of the conventional art will be described.

MEMS mirror driving schemes include: (a) resonant mode and (b) non-resonant mode. Light beam trajectory examples of the raster scan driven by (a) resonant mode and (b) non-resonant mode are shown in FIG. 4A and FIG. 4B, respectively. In the resonant mode shown in FIG. 4A, a MEMS mirror is driven at a resonant frequency, enabling a large displacement angle and a fast scan, but because the rotation velocities at the turn-around points and the center point of oscillation are different, and because the resonant frequency changes with temperature, control is required accordingly. On the other hand, in the non-resonant mode shown in FIG. 4B, the mirror may be rotated so that the light beam is stopped or moved, thus enabling equally spaced scanning, but the displacement angle is small and the scanning is slow.

Also, scans in the resonant mode shown in FIG. 4A and the non-resonant mode shown in FIG. 4B are both raster scans, in which the scanning is done in one stroke, therefore, programmable scanning such as the one shown in FIG. 5, from an arbitrary point to an arbitrary point at an arbitrary frequency in an arbitrary pattern, may not be performed. Such one-stroke raster scanning is done not only with the MEMS mirror, but also other mirrors including the polygon mirror, the galvanometer mirror and the resonant bulk mirror. This is because, in order to physically rotate a mirror with inertia and move it efficiently (at a high speed), it is efficient to employ the raster scan, which scans the closest possible location.

Lidars used for automated driving, driver operation support systems, etc. need to recognize human movements, objects, etc. in realtime, and therefore, it is desirable that light beam scanning used for them is performed at a high speed and a high density. However, in order to achieve this, a need exists for a scanning element, a fast light element and a fast electronic circuit capable of scanning a light beam at a high speed, thus generally increasing the cost of such a system. On the other hand, in order to safely drive a vehicle, the vehicle's front scene is not entirely important since the front scene includes many unimportant areas such as the background sky. For this reason, in order to effectively utilize a light beam operating at a finite speed, there is a desire for a scanning scheme in which a light beam scanning on important areas and unimportant areas are differently weighted.

FIG. 6 shows one conventional embodiment example of a light beam scanning scheme of Lidar used for automated driving or driving support systems. Here, since a MEMS mirror is used for a scanning element, a front scene from a vehicle is performed with a raster scan in one stroke. However, a background such as the sky (an area enclosed by a dashed line) is unimportant for the vehicle control, and instead, it is desired to scan important parts such as traffic lights, oncoming vehicles, humans, etc. (areas enclosed by a solid line) with a high image resolution and high frequency. Yet, the conventional scanning elements discussed above, which perform uniform scans, were incapable of fast, programmable scanning on arbitrary points at an arbitrary frequency in an arbitrary pattern.

PRIOR ART

Patent Document 1: Japanese Laid-open Patent Publication No. 2010-60656
Patent Document 2: U.S. Pat. No. 5,006,721
Patent Document 3: US 2012/0236379A1

Thus, problems of aforementioned conventional art to be solved are as below:
(1) The polarization diversity scheme (Patent Document 1) as a prior art polarization control technique is effective for elements operating on linearly polarized light, but is unusable for elements operating on circularly polarized light.
(2) In the conventional Lidar configurations, fine adjustments are required for assembly of optical axes and the like, making these configurations unsuited to mass production.
(3) Since the conventional configurations integrate the laser source and the Lidar, and have no resistance to high temperatures, it is difficult to mount the Lidar on top of the vehicle.
(4) The conventional scanning elements basically rotate the mirror or the like continuously, and due to the inertia, raster scans for scanning the scene in one stroke have been employed, making it impossible to discontinuously move from one arbitrary point to another, and scan with an arbitrary frequency in an arbitrary pattern at a high speed.

SUMMARY OF THE INVENTION

In the present invention, there was fabricated a circular polarization-type polarization diversity element for outputting light having a constant polarization state regardless of a polarization state of input light, wherein the polarization diversity element uses two polarization gratings, each polarization grating having a thickness such that the polarization grating becomes a half-wave plate, wherein birefringent directors of each polarization grating rotate with a period A, wherein these polarization gratings are disposed with a desired interval from each other, wherein having an arbitrary polarization state (SOP: State of Polarization), and wherein as a configuration, a half-wave plate is inserted in either one of two paths of separated, exiting right-handed or left-handed circularly polarized light beam, depending on a rotation direction of the circularly polarized light, to thereby enable conversion of the two light beams into parallel proximate circularly polarized light beams with the same rotational direction.

Also, there was fabricated a light beam digital scanning element using the circular polarization-type polarization diversity element, wherein the basic configuration is defined as a structure of transparent wedge blocks with a high refractive index disposed in a point-symmetrical manner on both sides of a polarization switching element, made of the blue phase liquid crystal and transparent electrodes, and the polarization grating is bonded thereto, and wherein in a multistage configuration of said basic configuration structures, with combinations of voltage applied or not applied to the respective polarization gratings, an output light beam is used to perform digital scanning.

Moreover, Lidar was constructed with the light beam digital scanning element, a semiconductor laser and a light receiving element, which were connected by a single-mode optical fiber and a single-mode optical fiber coupler without letting the light out to the external space, wherein the part of the light beam digital scanning element was divided from the remaining part, and those divided parts were connected by a single-mode optical fiber with a length of 1 m or more for flexibility in vehicle-mounted implementations to thereby achieve the structure capable of reducing the effect of temperature.

Finally, with a polarization switch and a polarization grating being defined as one set, a Lidar system was configured with a scanning element with a structure of a desired number of the polarization switch-polarization grating sets connected in multiple stages, thus enabling the movement from one arbitrary point to another discontinuously in terms of a light spot 11, and programmable scanning with an arbitrary frequency in an arbitrary pattern, as fast as the raster scan.

According to the configuration discussed above, the following have been achieved:
(1) Enablement of a polarization diversity scheme applicable to an element operating on circularly polarized light.
(2) Enablement of Lidar which eliminate the need for fine adjustments for assembly of optical axes and the like, thus, making the Lidar suited to mass production.
(3) Enablement of Lidar mountable at the top of a vehicle.
(4) Enablement of Lidar capable of movement from one arbitrary point to another discontinuously, and programmable fast scanning with an arbitrary frequency in an arbitrary pattern.

DETAILED DESCRIPTION OF THE INVENTION

Embodiment examples discussed in the following with respect to drawings should not be construed as limiting the scope of the present invention. Needless to say, these embodiment examples may be modified and implemented as needed.

Embodiment Example 1

Figure 7:
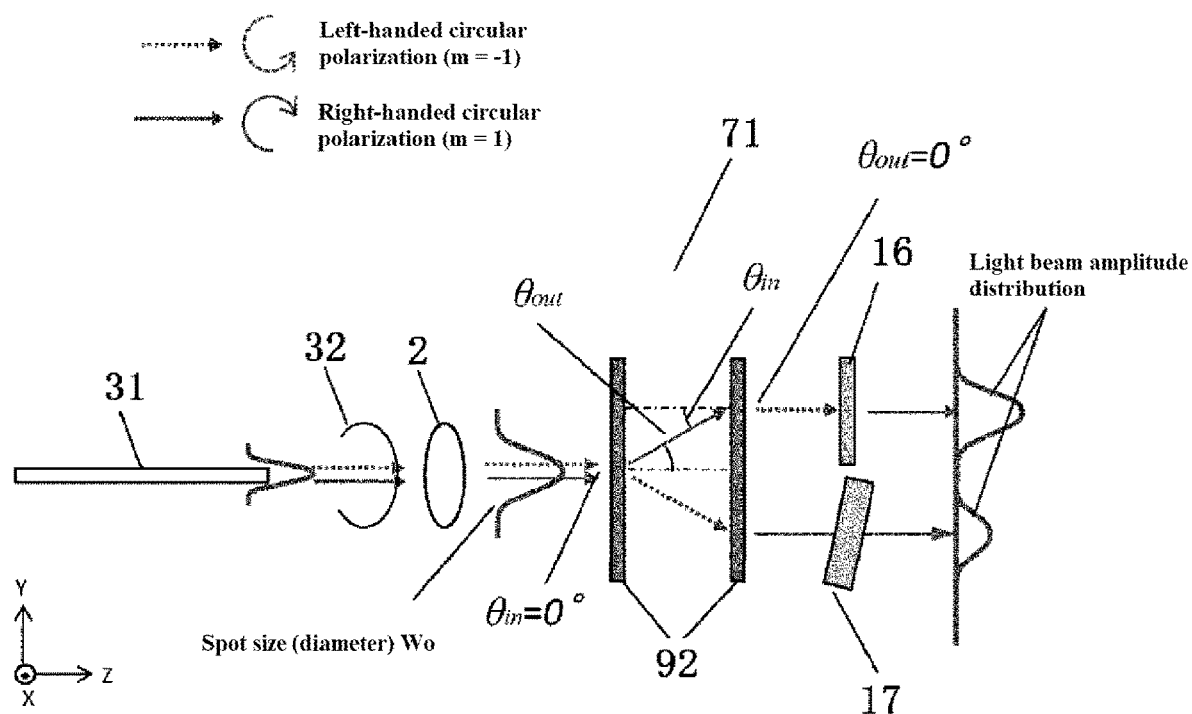
FIG. 7 is one embodiment example of a circular polarization-type polarization diversity element 71 according to the present invention.

FIG. 7 shows one embodiment example of a circular polarization-type polarization diversity element 71 according to the present invention. Light beams 32 which exited from a single-mode optical fiber 31 is collimated by a lens 2. Their polarization states may be broken down to the right-handed circular polarization (corresponding with m=+1: indicated by solid lines) and the left-handed circular polarization (corresponding with m=−1: indicated by dashed lines). Light beams 32 subsequently enter polarization gratings 92, and then, the right-handed circularly polarized light and the left-handed circularly polarized light are directed (deflected) upwardly and downwardly, respectively, and converted into respectively reverse-circular polarizations.

Figure 8:
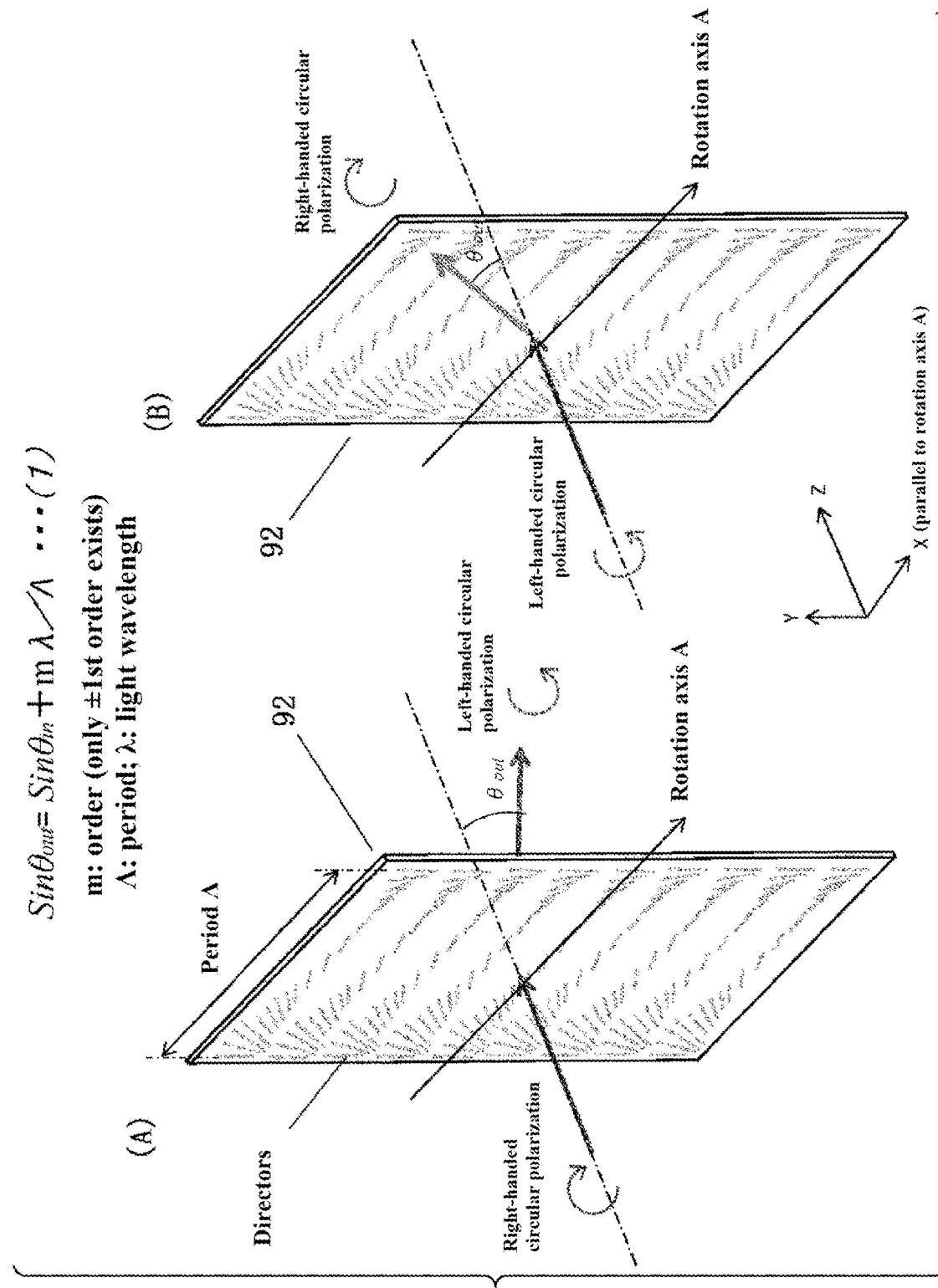
FIG. 8 is a diagram showing a structure and functionality of a polarization grating 92.

FIG. 8 shows a structure and functionality of a polarization grating 92. The polarization grating 92 is composed of, for example, liquid crystalline polymer or the like, and its directors rotate along an axis of rotation A at a constant period A. The thickness of the polarization grating 92 is designed so that the product of birefringence index difference of respective directors is equivalent to a half-wave plate. The present polarization grating 92 operates uniquely, wherein it switches (deflects) the propagation direction of the incident circularly polarized light beam within its X-Z plane towards right or left depending on the light beam's rotation direction.

For example, as shown in (A), right-handed circularly polarized light switches to the right and becomes left-handed circularly polarized light when outputted. Conversely, as shown in (B), left-handed circularly polarized light switches to the left and becomes right-handed circularly polarized light when outputted. The switching (deflection) angle $\theta_{out}$ is given by the Equation (1).

Here, m is the order, wherein many orders including ±1, ±2, ... exist in typical relief-type gratings, but in the present polarization grating 92, only ±1 orders exist corresponding with the right-handed and left-handed polarized light beams. Accordingly, light beams may be switched (deflected) with high-efficiency.

Again, FIG. 7 will be referenced below. Equation (1) applies to an incident angle $\theta_{in}$ and the exit angle $\theta_{out}$. The switching (deflection) angle $\theta_{out}$ is proportional to a multiplicative inverse of the period Λ, and the smaller the Λ is, the greater the deflection angle will be.

(Equation 1)

$$\text{Sine } \theta_{out} = \text{Sine } \theta_{in} + m\lambda/\Lambda \quad (1)$$

Here, m=±1 represents the right-handed circular polarization (corresponding with m=+1) and the left-handed circular polarization (corresponding with m=−1). When the light beams 32 enter the polarization grating 92 perpendicularly (θin=0°), the following equation applies:

(Equation 2)

$$\text{Sine } \theta_{out} = m\lambda/\Lambda \quad (2)$$

When these light beams enter the subsequent polarization grating 92, $\theta_{in}$ will be equal to $\theta_{out}$ ($\theta_{in}=\theta_{out}$) and the following applies:

(Equation 3)

$$\text{Sine } \theta_{out}=\lambda/\Lambda-\lambda/\Lambda \tag{3}$$

Thus, ultimately the light beams propagate parallelly to Z-axis. Also, as shown in FIG. 7, the right-handed circularly polarized light and the left-handed circularly polarized light become two light beams offset with each other and propagating in parallel. This offset is determined by twice the separation angle of the polarization grating 92 ($2\theta_{out}$) and spacing between the two polarization gratings 92, and the offset is preferably about the spot size (diameter) Wo.

If a half-wave plate 16 is inserted in one of the optical paths, the two light beams will rotate in the same (here, right-handed circular polarization) direction to thereby enable the circular polarization-type polarization diversity element 71. It should be noted that a phase plate 17 may be inserted in the other optical path to adjust phases of the two light beams.

Embodiment Example 2

Figure 9A:
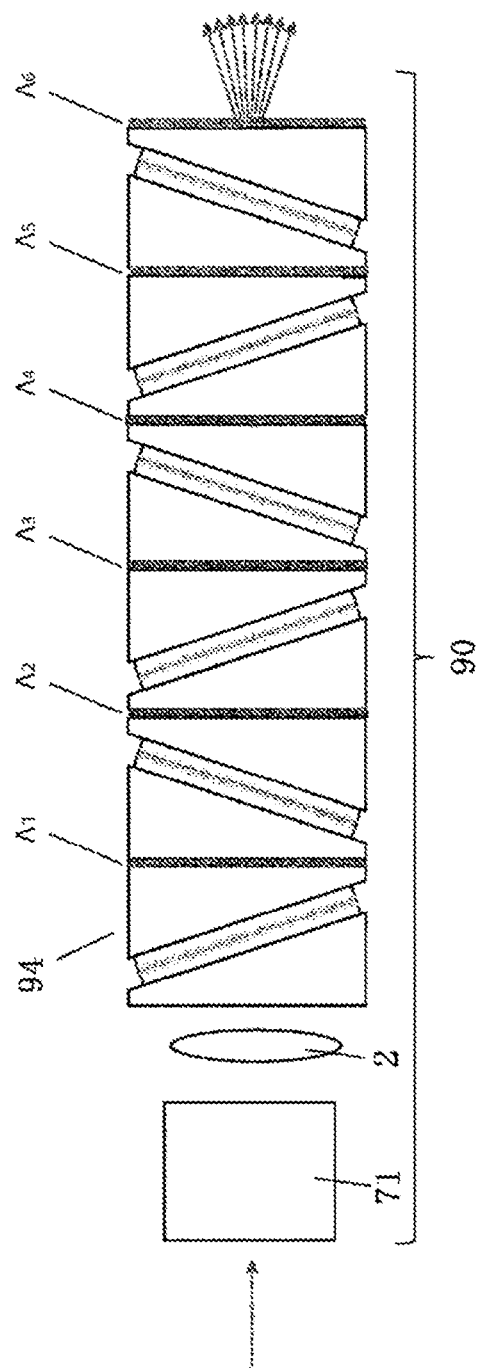
FIG. 9A shows one example of a light beam digital scanning element.
Figure 9B:
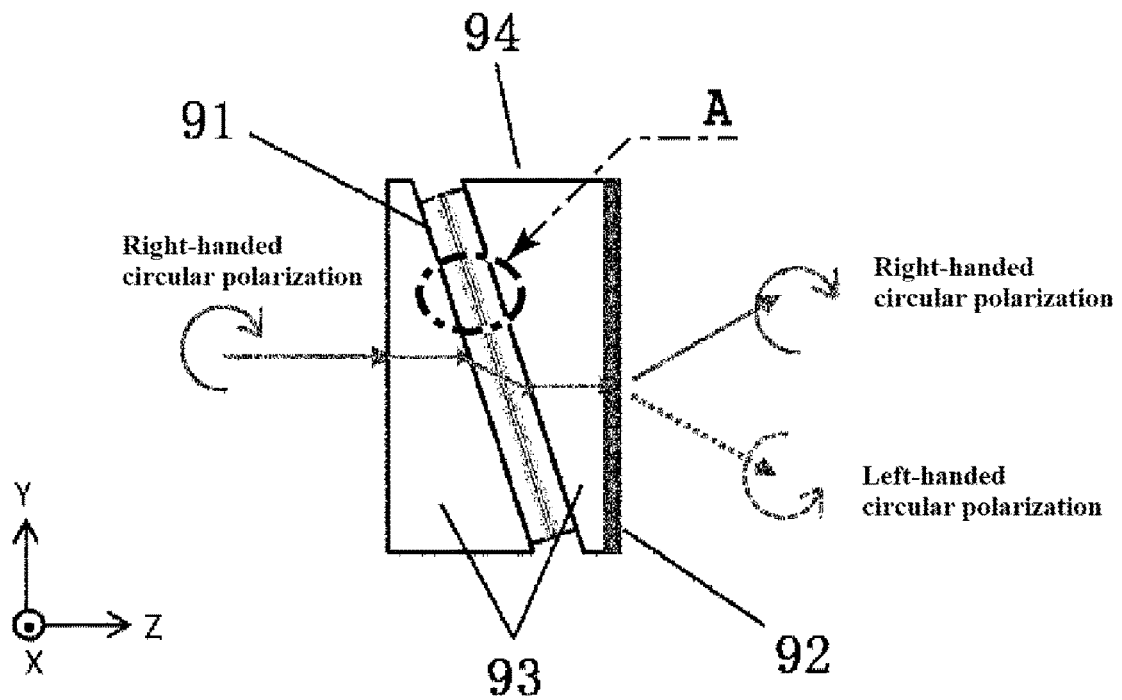
FIG. 9B is a diagram showing one example of a basic unit.
Figure 9C:
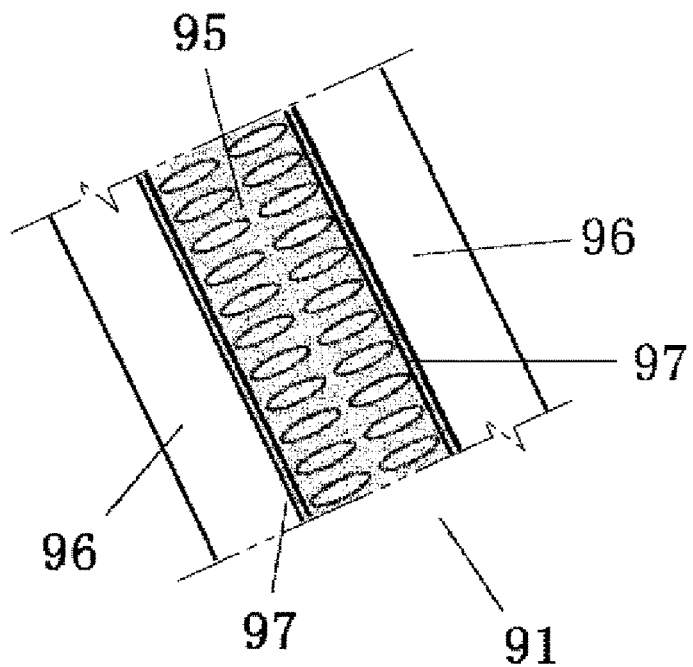
FIG. 9C is an enlarged view of a structure of a part of a polarization switching element.

One example of light beam digital scanning elements using the present circular polarization-type polarization diversity element 71 is shown in FIG. 9A-FIG. 9C. FIG. 9A shows a light beam digital scanning element, and FIG. 9B shows a basic unit. Also, FIG. 9C is an enlarged view of a structure of an area enclosed by a dashed-dotted line A of a polarization switching element 91. The light beam digital scanning element 90 shown in FIG. 9A has a desired number of the connected, multistage basic units 94, each shown in FIG. 9B, provided with the circular polarization-type polarization diversity element 71 and a lens 2.

As illustrated in FIG. 9B and FIG. 9C, the basic unit 94 has the polarization switching element 91, which is defined by polymer-stabilized blue phase liquid crystal 95 sandwiched by two plate electrodes 96, each having a transparent electrode 97 formed on a glass substrate of the respective plate electrodes 96; and two wedge blocks 93 of a material with high refractive index, sandwiching the polarization switching element 91 in a point-symmetrical manner. Also, on a light output surface of the basic unit 94, a polarization grating 92 is disposed or bonded.

Operation of the basic unit of the present light beam scanning element will be discussed below. The polarization switching element 91 is an isotropic medium when voltage is not applied thereto, and thus, incoming polarized light exits maintaining its state. When desired electric field is applied, the polarization switching element 91 operates as a half-wave plate to reverse the rotation direction of the circular polarization.

Now, as shown in FIG. 9B, it is assumed that right-handed circularly polarized light enters the basic unit 94 from the left side. The incident light upon the wedge block 93 made of the material of high refractive index propagates through the polarization switching element 91 with an angle according to the Snell's law.

Accordingly, the birefringence index generated in the blue phase liquid crystal may be utilized efficiently. Subsequently, again according to Snell's law, the light beam entering the wedge block 93 made of the material of high refractive index becomes parallel to Z-axis, and enters the polarization grating 92 perpendicularly. Here, due to the voltage applied to the blue phase liquid crystal 95, the light beam deflects in the up-down direction (here, the directors' rotation axis A, shown in FIG. 8, is positioned parallel to Y-axis).

The light beam digital scanning element 90 shown in FIG. 9A is configured to have the circular polarization-type polarization diversity element 71, the lens 2 and the basic units 94 connected in multiple stages.

Note that the lens 2 is for converting the spot size, and several lenses may be used, or no lens may be used. Incident light of an arbitrary polarization state from the left side is turned to either one of the right-handed or left-handed circularly polarized light by the circular polarization-type polarization diversity element 71, converted to a light beam of an arbitrary spot size by the lens 2, and then, enters a block of basic units 94 connected in multiple stages.

The periods $\Lambda 1$-$\Lambda 6$ of the polarization gratings 92 changes from left to right, and depending on their angles, the light beam passing the polarization gratings 92 will have deflection angles digitally controlled with 2N (N is a stage number, N=1, 2, 3, . . . ). Here, it is important that, by turning the voltage applied to each blue phase liquid crystal 95 ON (bi 1) or OFF (bit 0), the light beam position may be controlled (programmed) digitally.

For example, a bit sequence (111111) represents the most upward light beam and a bit sequence (000000) represents the most downward light beam. Unlike the cases with the MEMS mirror, these light beams are not influenced by inertia, and their positions move discretely. In other words, the top beam may move to the bottom beam instantly. Similarly, other light beams move instantly.

Figure 5:
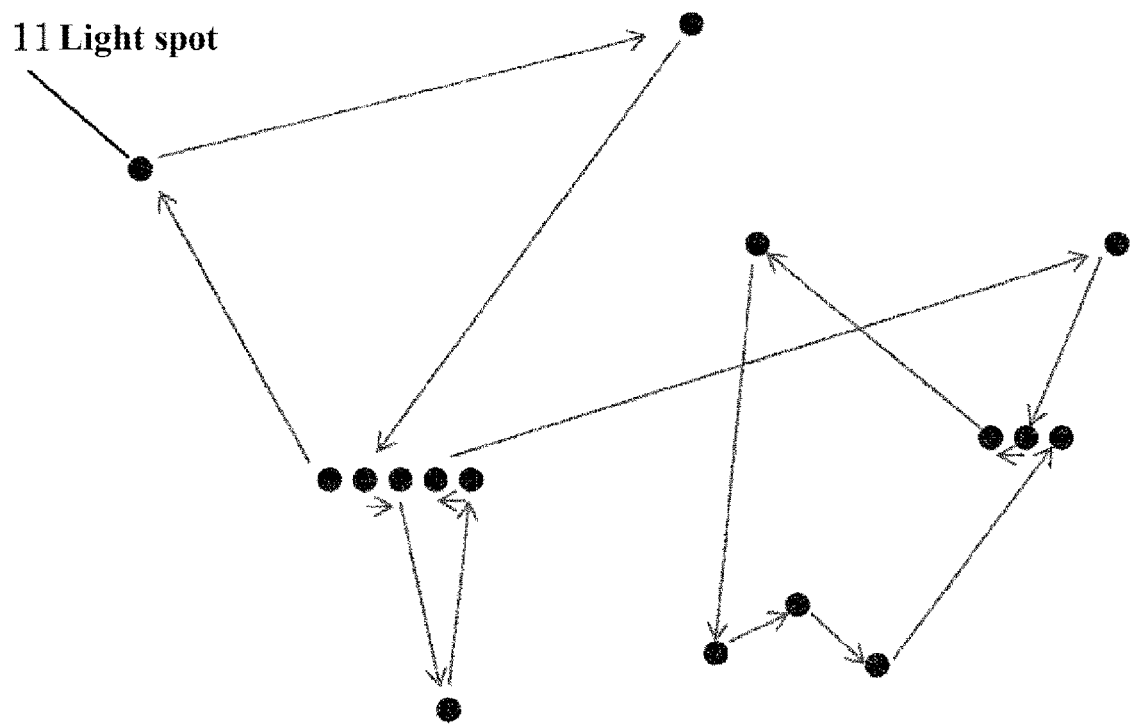
FIG. 5 is one example of an ideal scan, scanning from an arbitrary point to another arbitrary point with an arbitrary frequency in an arbitrary pattern.
Figure 6:
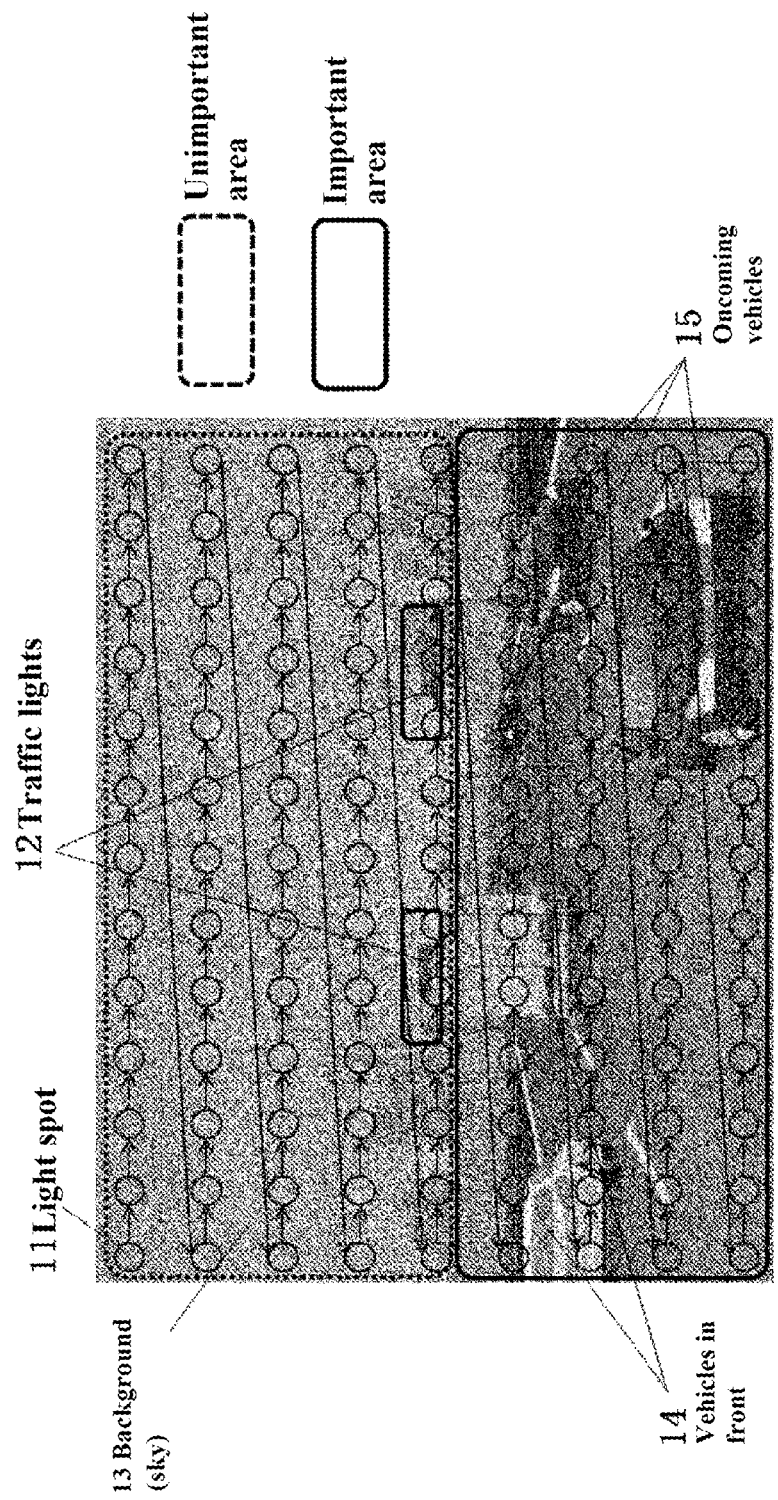
FIG. 6 shows one conventional embodiment example of a light beam scanning scheme of Lidar used for automated driving or driving support systems.

This operation may be possible two dimensionally on the X-Y plane by disposing the basic units 94 orthogonally in multiple stages. Using this light beam digital scanning element 90, even random movements, as shown in FIG. 5, which were difficult with the conventional art, may be possible by programming those movements in advance from an arbitrary point to an arbitrary point at an arbitrary frequency in an arbitrary pattern selected to thereby flexibly scan light beams.

Figure 10:
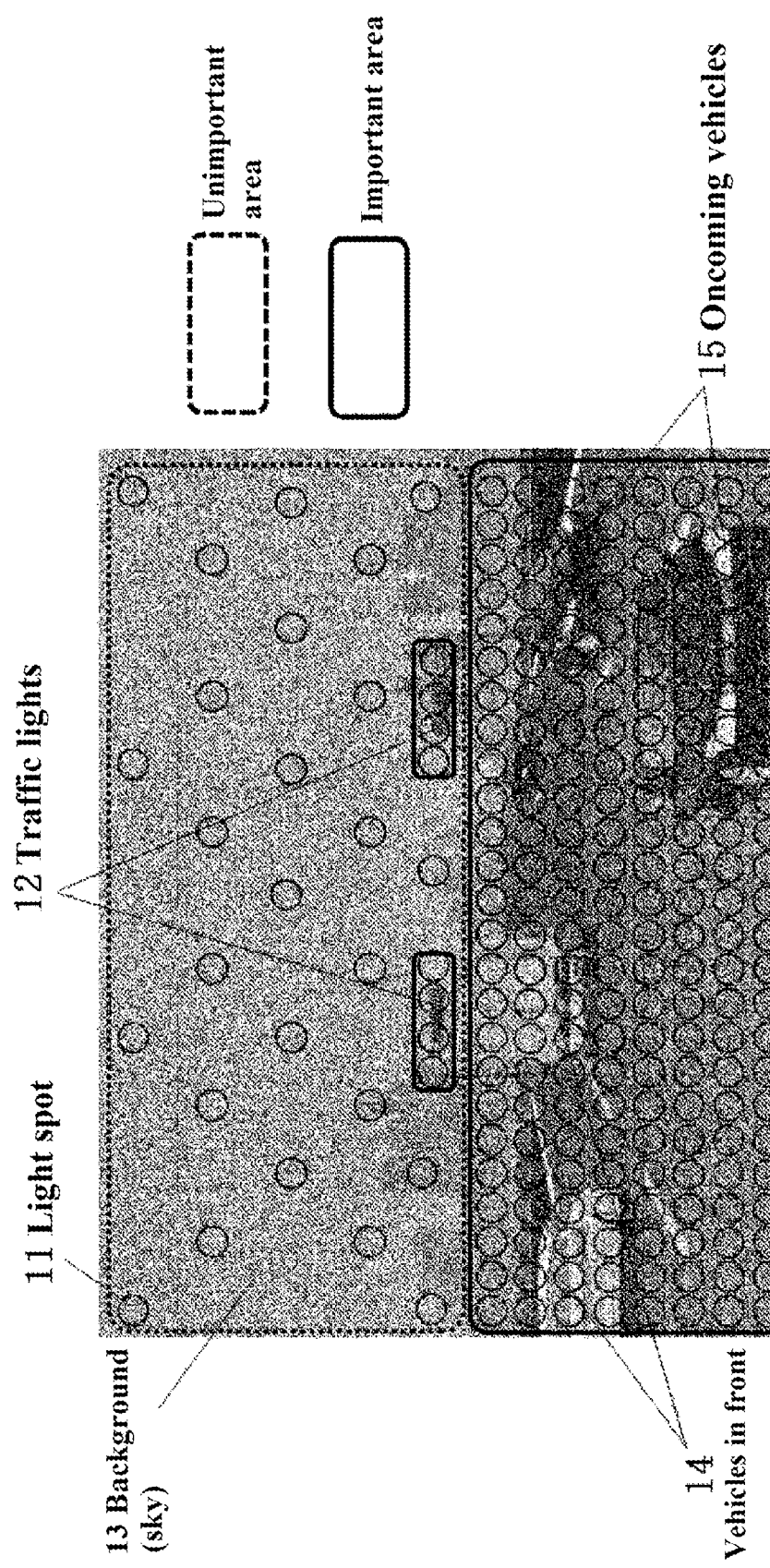
FIG. 10 shows weighted digital scanning ideal for automated driving.

Also, the weighted digital scanning such as one shown in FIG. 10, which have been difficult to implement with the conventional art, will be enabled, wherein important areas for automated driving, corresponding to traffic lights, vehicles in front, oncoming vehicles, etc. are scanned with higher densities and frequencies; and unimportant areas for automated driving, corresponding to the sky, etc. are scanned sparsely (with lower densities) and with lower frequencies.

Figure 15A:
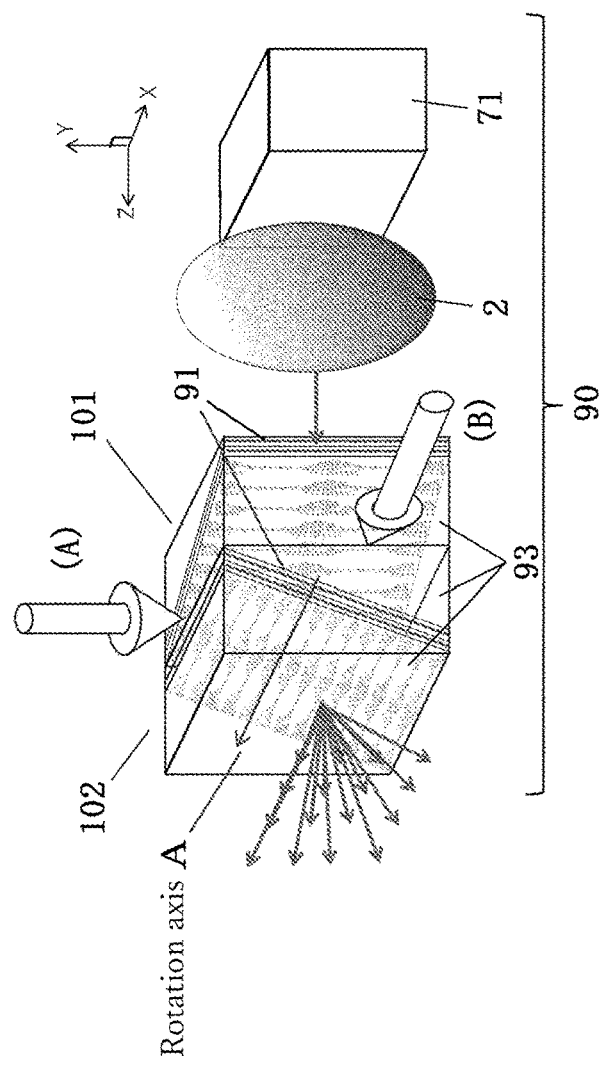
FIG. 15A is a perspective view of a light beam digital scanning element in another embodiment example.
Figure 15B:
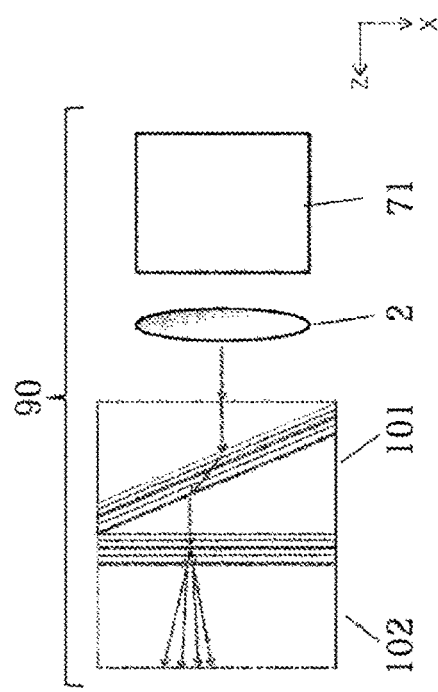
FIG. 15B is a plan view of the light beam digital scanning element in the other embodiment example.
Figure 15C:
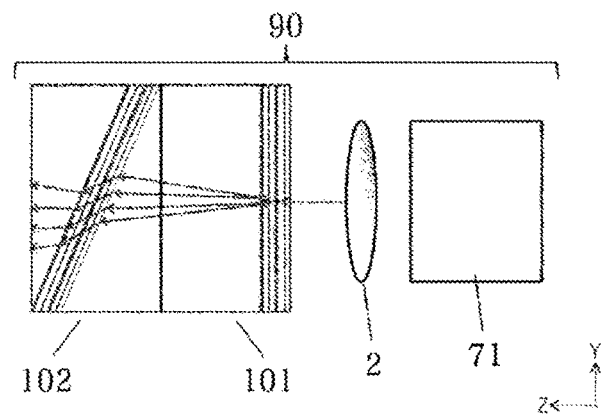
FIG. 15C is a side view of the light beam digital scanning element in the other embodiment example.
Figure 15D:
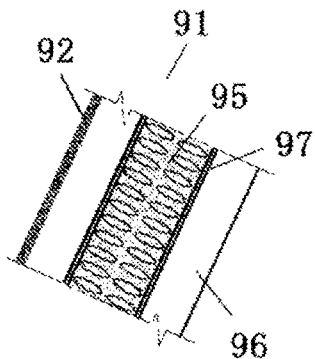
FIG. 15D is an enlarged view of the structure of a part of a polarization switching element of the light beam digital scanning element in the other embodiment example.

FIG. 15A-FIG. 15D show another embodiment example of a light beam digital scanning element. FIG. 15A is a perspective view of a light beam digital scanning element 90. FIG. 15B is a plan view of the light beam digital scanning element 90 of FIG. 15A viewed from the direction indicated by an arrow (A). FIG. 15C is a side view of the light beam digital scanning element 90 of FIG. 15A viewed from the direction indicated by an arrow (B). FIG. 15D is an enlarged view of a part of a polarization switching element structure.

Basic units 101 and 102 switch (deflect) light beams to the Y-direction and the X-direction, respectively. Each basic unit has a set of a polarization switching element 91 and a polarization grating 92 bonded together, wherein multistage polarization gratings 92 with different director rotation periods $\Lambda$, respectively, are disposed or bonded together, and wherein two wedge blocks 93 made of the highly refractive material sandwich the multistage polarization gratings 92 at the both ends thereof in a point-symmetrical manner.

As shown in FIG. 15D, the polarization switching element 91 is defined by a blue phase liquid crystal 95 sandwiched by two plate electrodes 96, each having a transparent electrode 97 formed on a glass substrate of the respective plate electrodes 96, wherein the polarization switching element 91 operates an isotropic medium when voltage is not applied thereto, and incident polarized light exits maintaining its state. When desired electric field is applied, the polarization switching element 91 operates as a half-wave plate to reverse the rotation direction of the circular polarization. Accordingly, it is capable of achieving similar functionality to that of the light beam digital scanning element shown in FIG. 9A-FIG. 9C.

Embodiment Example 3

Figure 1:
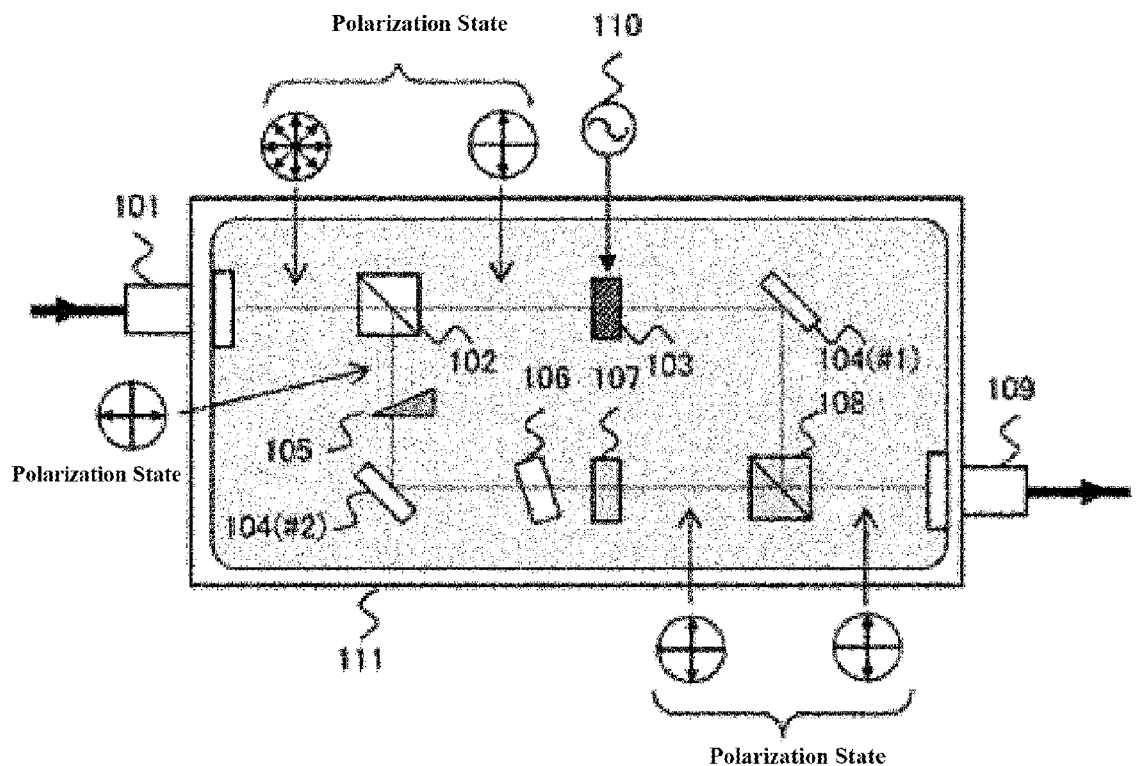
FIG. 1 is one embodiment example of conventional polarization diversity (Patent Document 1)
Figure 1:
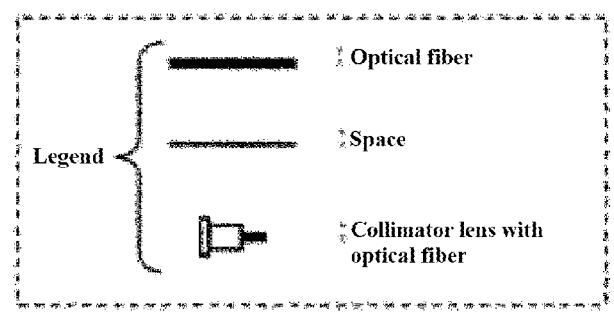
Figure 2:
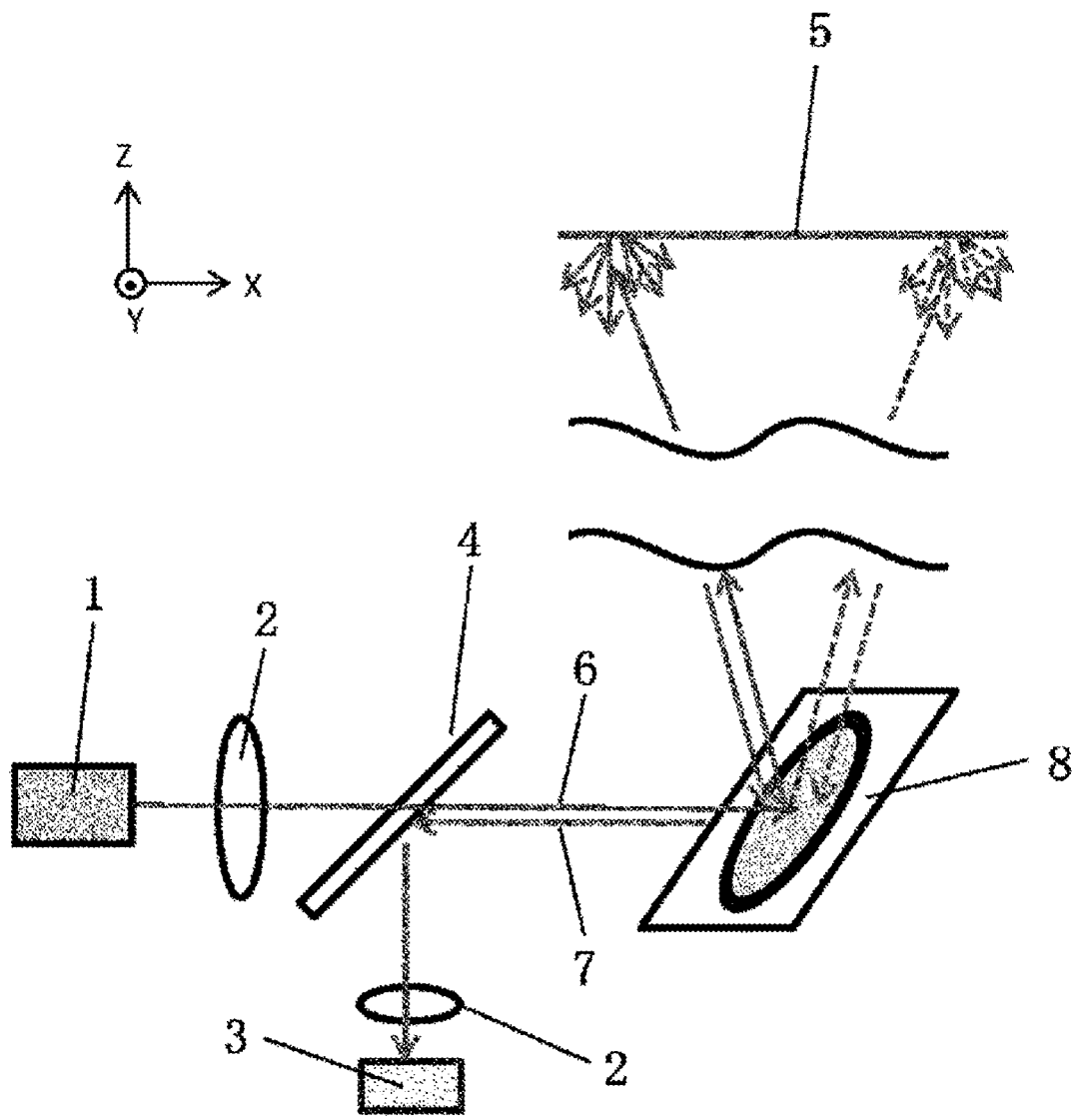
FIG. 2 shows a configuration of Lidar using a MEMS mirror 8, which is a conventional scanning element.
Figure 3:
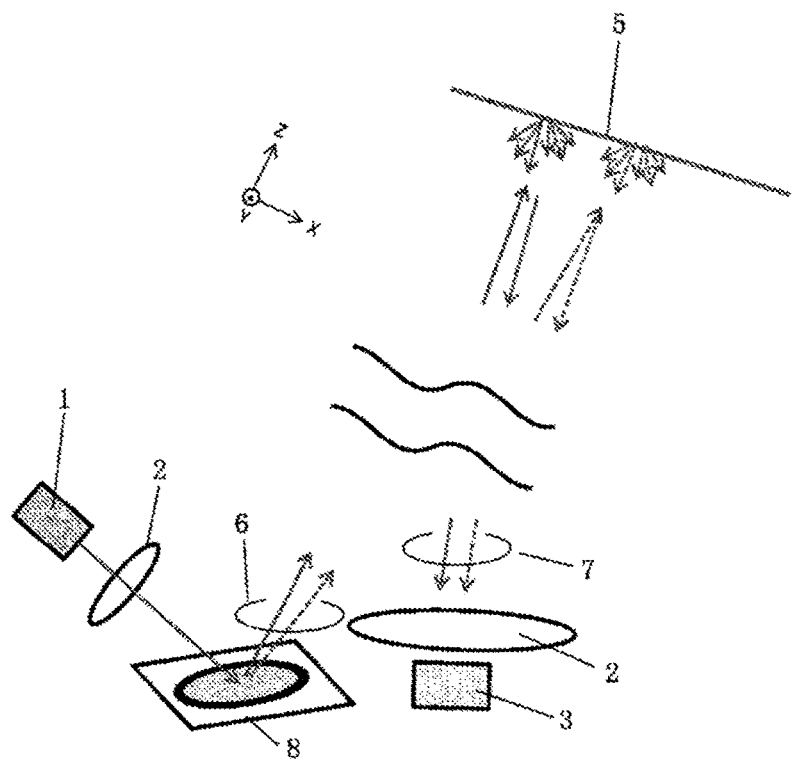
FIG. 3 shows a configuration of another conventional Lidar.
Figure 4A:
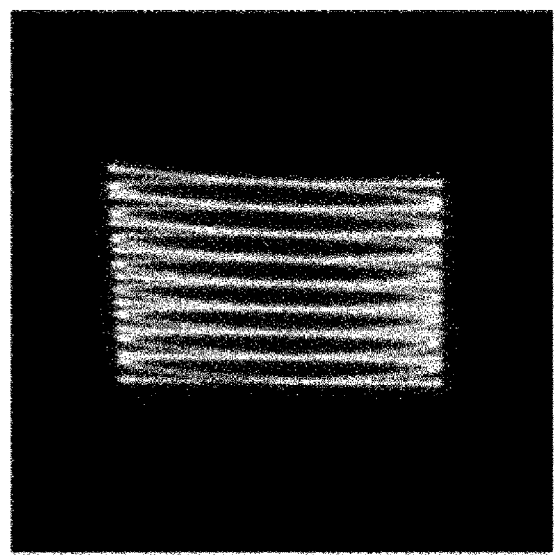
FIG. 4A is one example of a light beam trajectory of a raster scan when driven in the resonant mode.
Figure 4B:
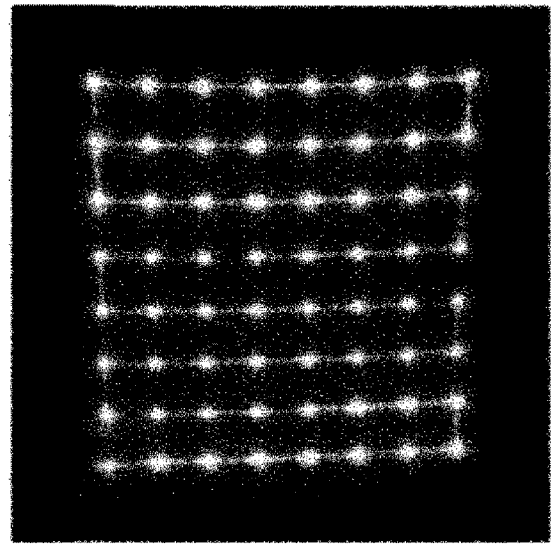
FIG. 4B is one example of a light beam trajectory of a raster scan when driven in the non-resonant mode.
Figure 11:
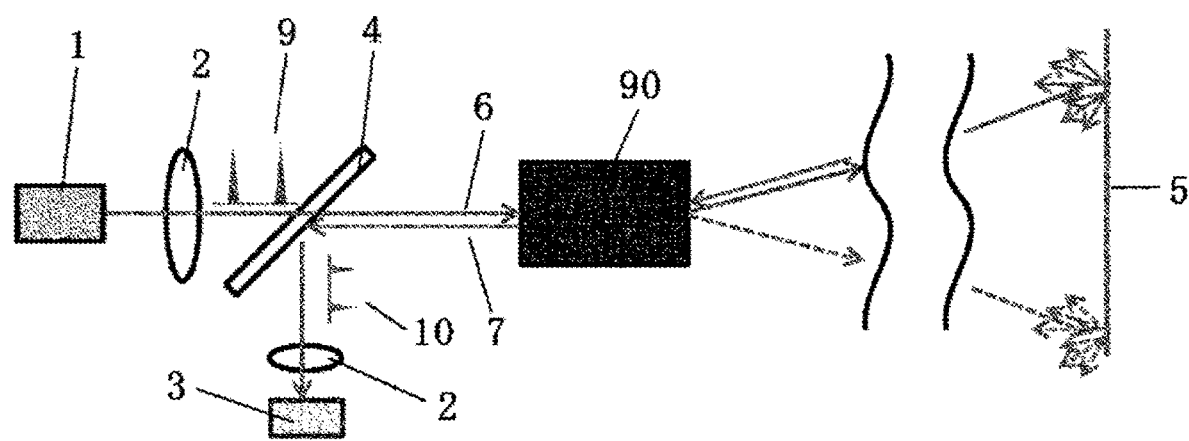
FIG. 11 shows one embodiment example of ToF (Time of Flight) scheme Lidar capable of implementing the ideal weighted digital scanning.

FIG. 11 shows one embodiment example of Lidar capable of implementing the above-described scan. The present Lidar is the same coaxial system as the one in FIG. 2 discussed previously in terms of configuration, but this Lidar is using a transmissive-type light beam digital scanning element 90 instead of a reflective MEMS mirror 8 as a steering element.

On the other hand, various schemes have been reported for Lidar modulation. In the present embodiment example, ToF (Time of Flight) scheme is employed as a modulation scheme. This scheme measures a time difference T between light pulse 9 transmission (light pulse 9 received at a light receiving element 3) and light pulse 10 reception (light received at the light receiving element 3) to measure a distance d to an object 5, according to d=cT/2 (here, c is the speed of light). Note that T is corrected as needed depending on optical path lengths in the Lidar configuration.

In order to improve the distance precision, an electronic circuit and an optical element capable of transmitting and receiving continuous short light pulses will be needed.

Embodiment Example 4

Figure 12:
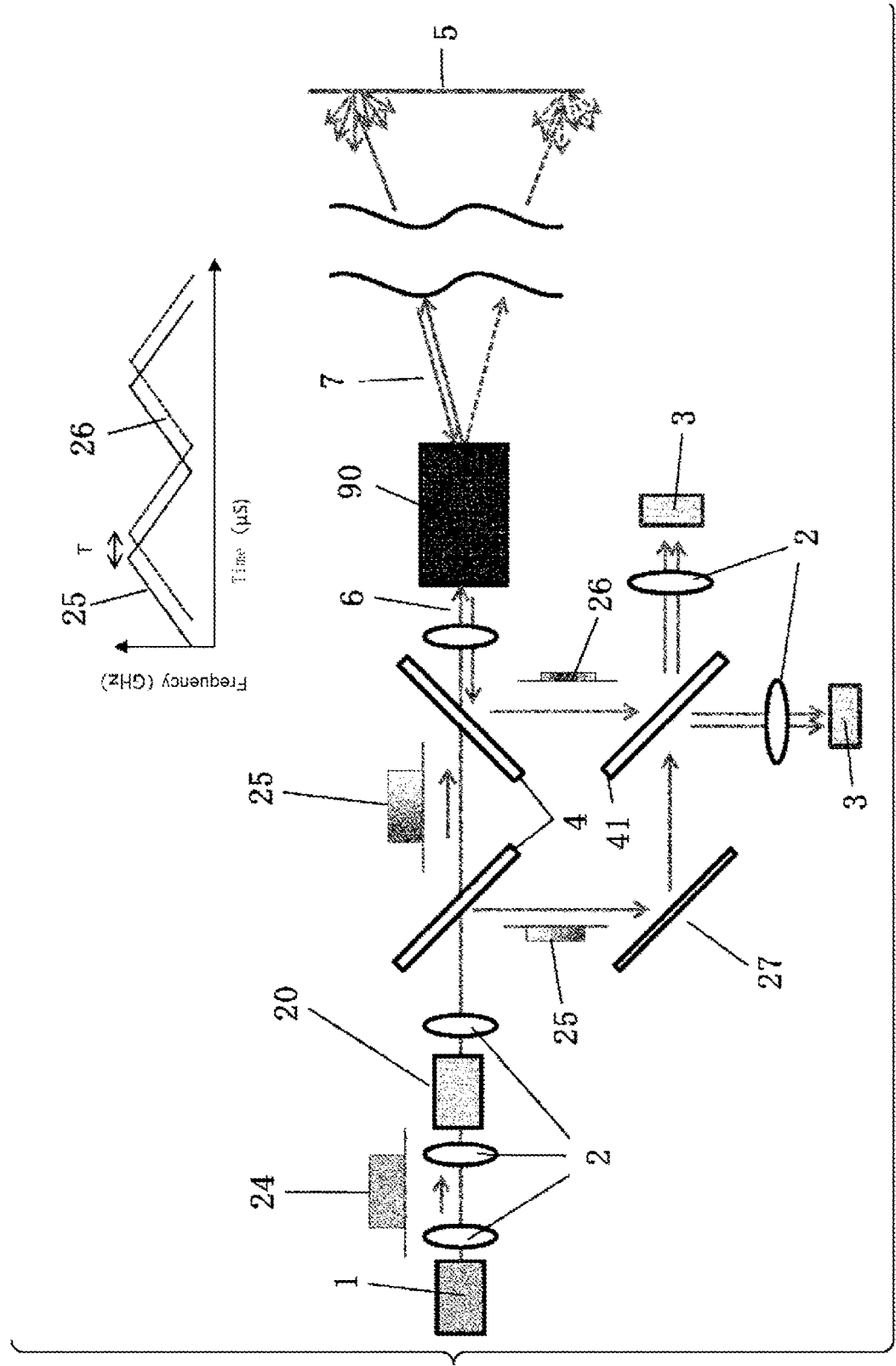
FIG. 12 shows an embodiment example of optical FMCW scheme Lidar capable of implementing the ideal weighted digital scanning.

FIG. 12 shows another embodiment example using a light beam digital scanning element 90. This modulation scheme, referred to as the optical FMCW scheme, uses a semiconductor laser 1 as a light source for emitting single narrow frequency range with good coherence.

Light in square waves 24 (temporally rectangular) emitted from the semiconductor laser 1 is converted using an optical frequency modulator 20 to square waves 25 with chirped frequencies (frequency increases or decreases linearly over time). The optical frequency modulator 20 may be implemented by a modulator using $LiNbO_3$ or the like but may also be implemented by varying the electric current directly supplied to the semiconductor laser 1 without using the optical frequency modulator 20. The square waves 25 with chirped frequencies transmit two beam splitters 4, and then, converted to collimated light of a desired light beam size using a lens 2.

Subsequently, the light beam 6 enters the light beam digital scanning element 90, scans with a desired scanning pattern and irradiates an object 5. Reflected light 7 back from the object 5 is transmitted through the light beam digital scanning element 90, is reflected by the beam splitter 4 and then, enters a beam splitter 41 for mixing.

Meanwhile, from the left side of the beam splitter 41 for mixing, the light emitted by the semiconductor laser 1, split by the beam splitter 4 and reflected by a total reflection mirror 27 enters the beam splitter 41. In this manner, at the beam splitter 41 for mixing, the square waves 25 composed of square waves of two chirped frequencies offset by the time difference T, and return square waves 26 are mixed (combined), and received at two light receiving elements 3 thereafter.

By adjusting the amounts of light at these two light receiving elements 3, small light alternating current signals on a direct current component may be received efficiently. From the two light receiving elements 3, the beat frequency (fb) of beat signals, generated by mixing the square waves 25 and the return square waves 26, is obtained, and the distance d to the object 5 is obtained from $d=C\times fb/(4\Delta f\times fm)$. Here, $\Delta f$ is the amount of frequency chirp change (peak-to-peak frequency displacement) and fm is the repetitive modulation frequency of the frequency chirp. Compared to the ToF (Time of Flight) scheme, the optical FMCW scheme has somewhat complex optical elements, but may obtain high S/N (signal-to-noise ratio).

Having described the two Lidar schemes above, in the present invention it is important to use, as a scanning element, the light beam digital scanning element 90 capable of programmable scanning from an arbitrary point to an arbitrary point at an arbitrary frequency in an arbitrary pattern. The present light beam digital scanning element, which has no need to move an inertial object such as the MEMS mirror, is capable of having a light beam irradiation position jump discretely from an arbitrary point to another arbitrary point, as shown in FIG. 5.

Since this movement may be freely controlled by, for example, a program or means such as hardware control, the weighted digital scanning, which have been difficult to implement with the conventional art, will be enabled, wherein, as shown in FIG. 10, important areas for automated driving, corresponding to traffic lights, vehicles in front, oncoming vehicles, etc. are scanned with higher densities and frequencies; and unimportant areas for automated driving, corresponding to the sky, etc. are scanned sparsely and with lower frequencies.

Embodiment Example 5

Figure 13:
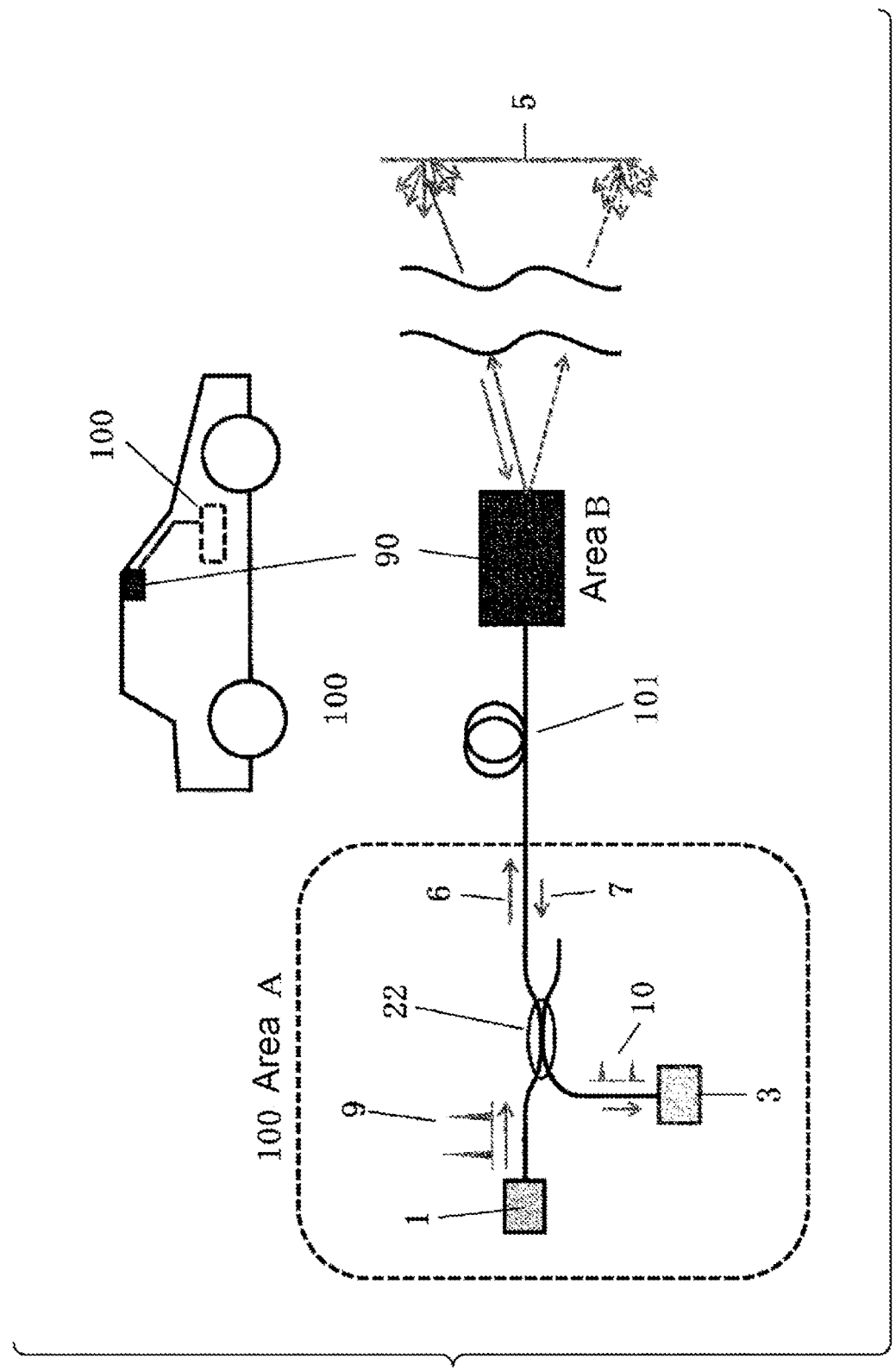
FIG. 13 shows another embodiment example of the ToF (Time of Flight) scheme, shown in FIG. 11.

FIG. 13 shows another embodiment example of the ToF (Time of Flight) scheme, shown in FIG. 11. The present Lidar has an all-fiber configuration, using a single-mode optical fiber coupler 22 instead of the bulk-type beam splitter 4 to confine the light within single-mode optical fibers 101.

Also, an area A, which has a semiconductor laser 1, a light receiving element 3, etc. performances of which deteriorate at high temperatures, and an area B, which is a light beam digital scanning element 90, are connected by the single-mode optical fiber 101 with a length of about 1 m.

In general, when considering Lidar mounted on a vehicle, it is desirable to place the Lidar at an elevated position in order to measure the front scene over long distances. However, a vehicle ceiling part often suffers high temperatures due to the heating by sunlight. For this reason, in the present embodiment example, the light beam digital scanning element 90, not prone to damages from high temperatures, is positioned near the vehicle ceiling part; and the area A, which has the semiconductor laser 1, the light receiving element 3, a signal processing and control section for processing the above-mentioned light alternating current signals, etc., and which is prone to damages from high temperatures, may be positioned in the vehicle where the temperature is low; wherein a highly reliable Lidar may be achieved by connecting the light beam digital scanning element 90 and the area A with the single-mode optical fiber 101 with a length of about 1 m.

Also, since the single-mode optical fiber 101 confines the light paths to eliminate the need for complex optical axis adjustment, this system may be assembled only by connecting the optical fibers, making this system very suited for mass production.

Embodiment Example 6

Figure 14:
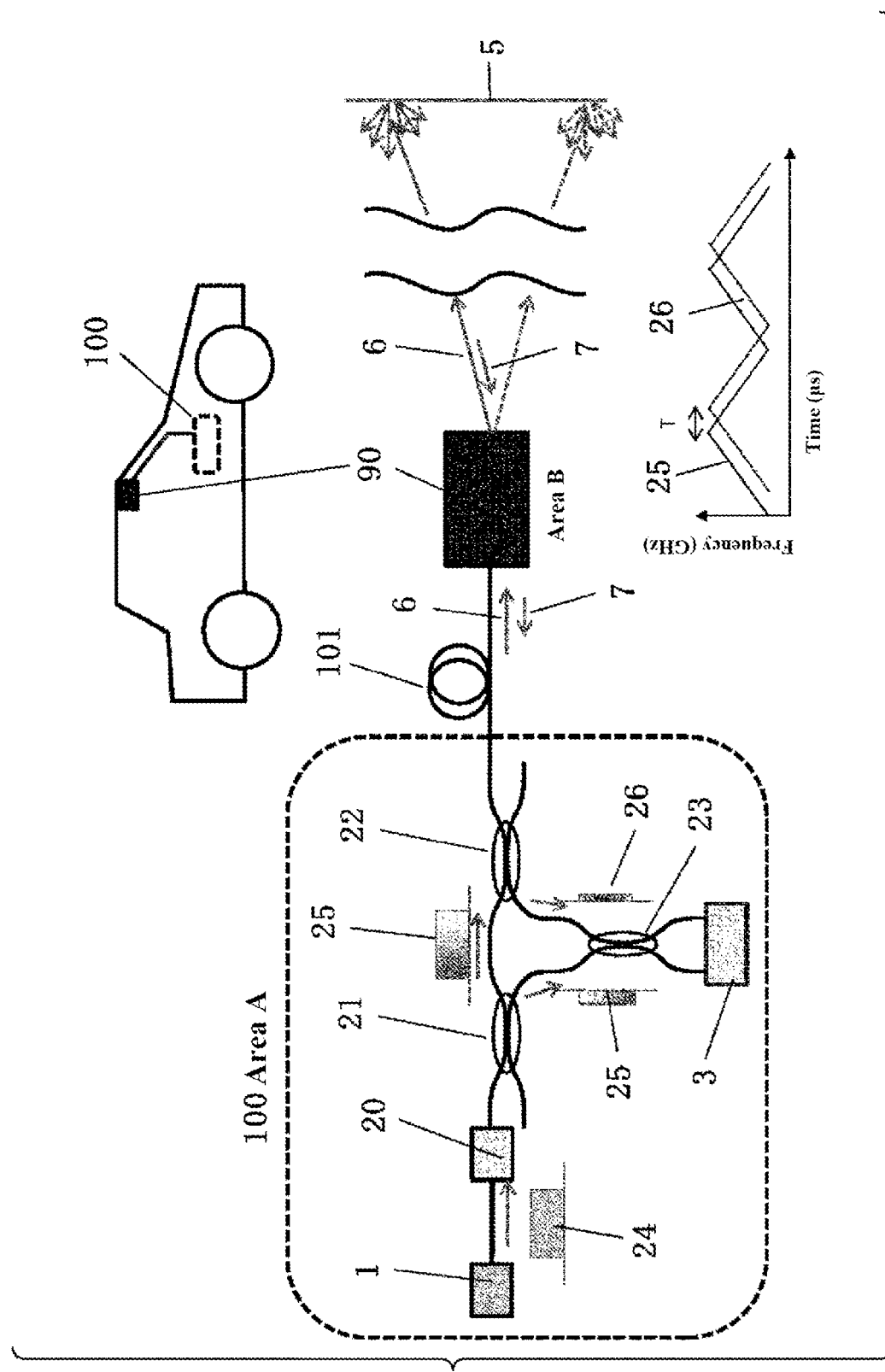
FIG. 14 shows a variation of the optical FMCW scheme, shown in FIG. 13, and is an all-fiber configuration with its light contained within the single-mode optical fiber 101.

FIG. 14 shows a variation of the optical FMCW scheme, shown in FIG. 13, and is an all-fiber configuration with its light contained within the single-mode optical fiber 101. The effect of this system is the same as the above.

Embodiment Example 7

Figure 16:
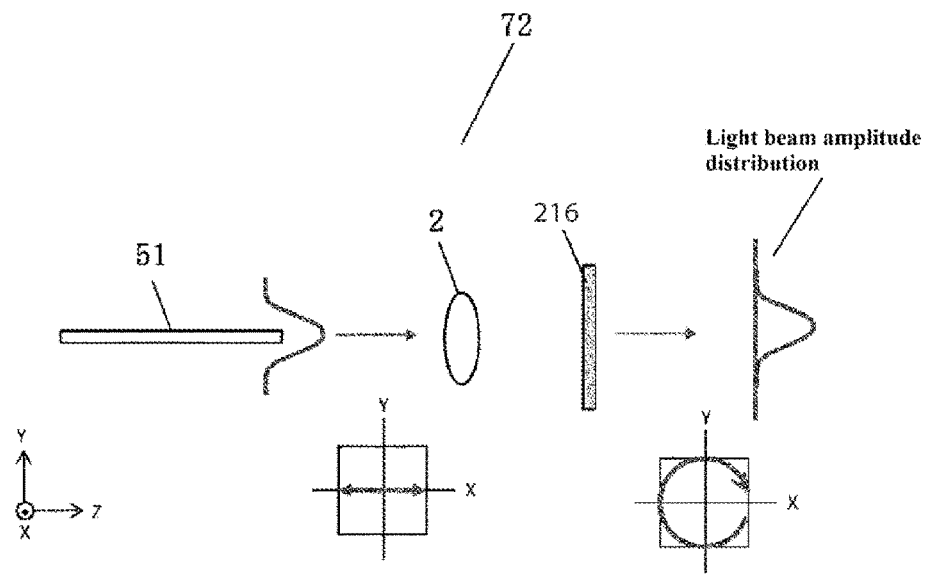
FIG. 16 shows a circular polarization converter, which is another embodiment example having the same functionality as that of the circular polarization-type polarization diversity element 71 of FIG. 7.

FIG. 16 shows a circular polarization converter, which is another embodiment example having the same functionality as that of the circular polarization-type polarization diversity element 71. This circular polarization converter 72 is composed of a polarization-maintaining optical fiber 51, a collimating lens 2 and a quarter-wave plate 216. Linearly-polarized light entering the main axis (fast axis or slow axis) of the polarization-maintaining optical fiber 51 exits it while maintaining the linear polarization state (here, linear polarization oscillating on X-axis is assumed), and is collimated by the lens 2. The birefringence axis of the quarter-wave plate 216 is angled by 45° from X-axis, and the light passing through the quarter-wave plate 216 becomes right-handed circularly polarized light, as shown in the figure. This circular polarization converter 72 may be positioned in front of the scanning element to achieve the light beam digital scanning element 90.

Figure 17:
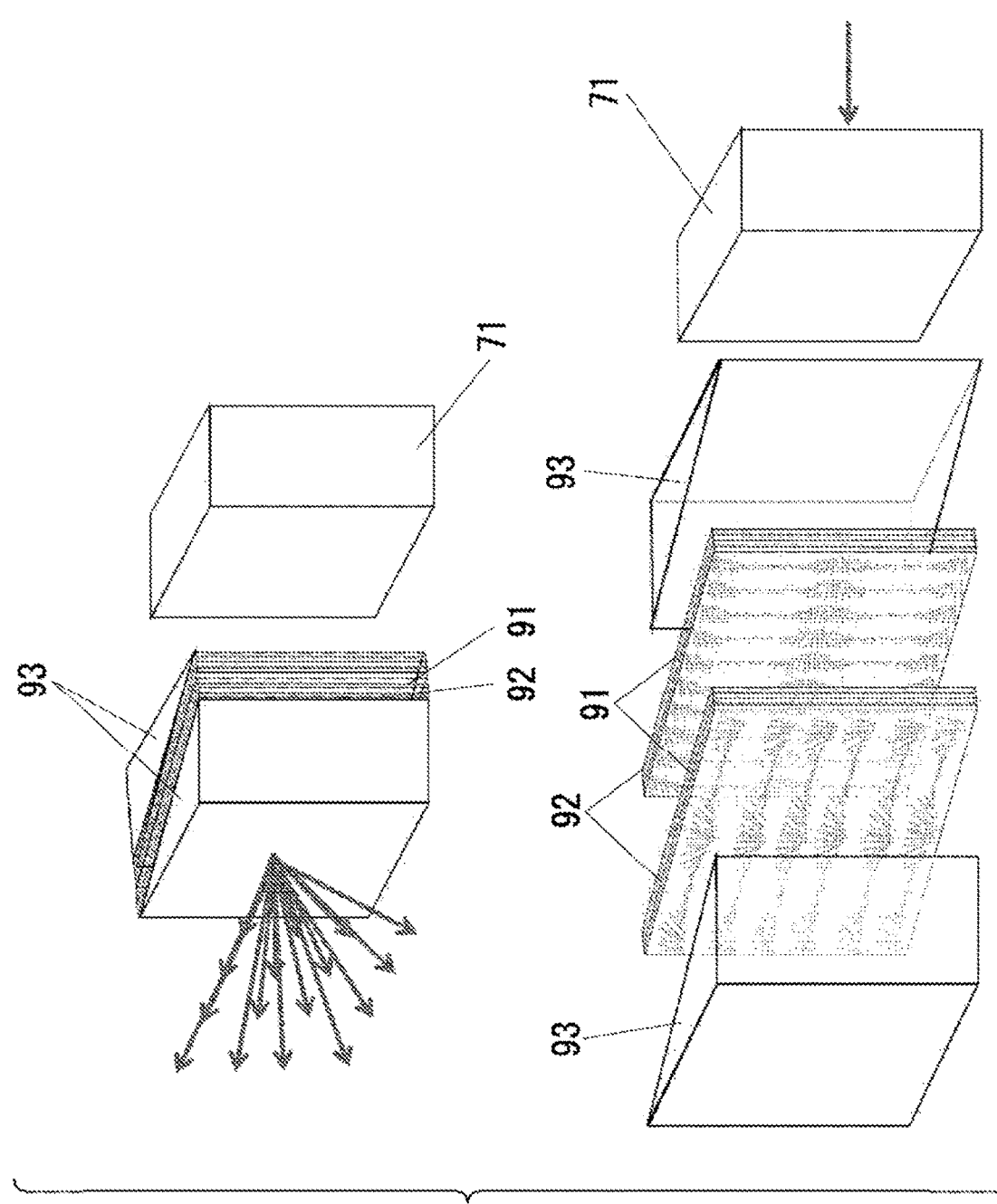
FIG. 17 is a diagram showing a light beam digital scanning element in another embodiment example.

FIG. 17 is another embodiment example of a light beam digital scanning element. The light beam digital scanning element shown in FIG. 17 uses two sets of basic units for X- and Y-directions, respectively, wherein each basic unit consists of a polarization switch 91 and a polarization grating 92 bonded together, wherein each set of basic units has multiple stages of the basic units bonded together, wherein the two sets of basic units are bonded perpendicularly to each other and wherein the bonded two sets of basic units are sandwiched by right-handed 93 in a point-symmetrical manner. According to the configuration of the light beam digital scanning element illustrated in FIG. 17, further size reduction is possible. For the wedge blocks 93, silicon or glass may be used.

Figure 18A:
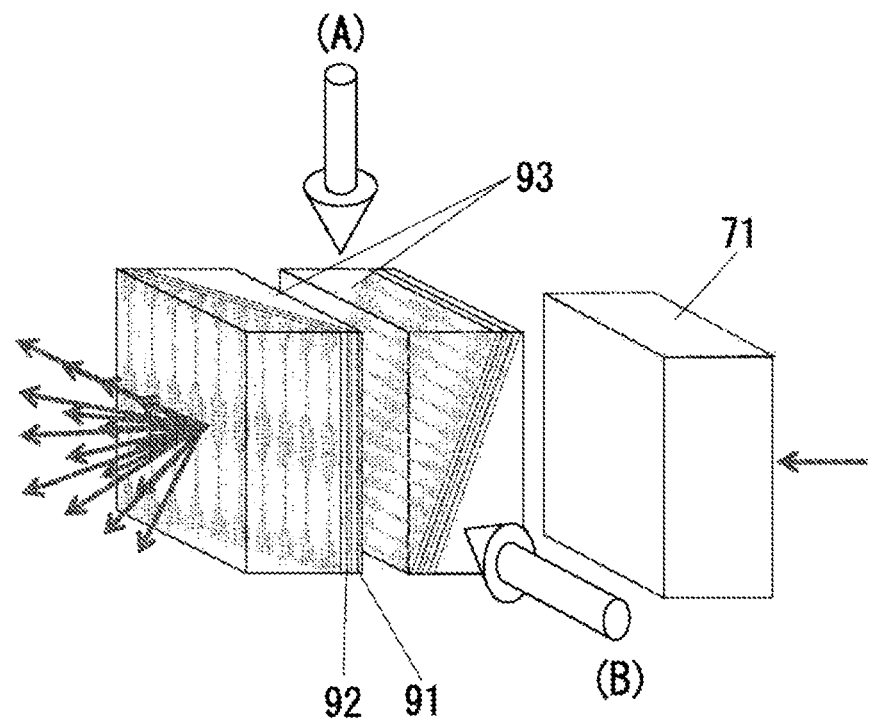
FIG. 18A is a perspective view of a light beam digital scanning element in another embodiment example.
Figure 18B:
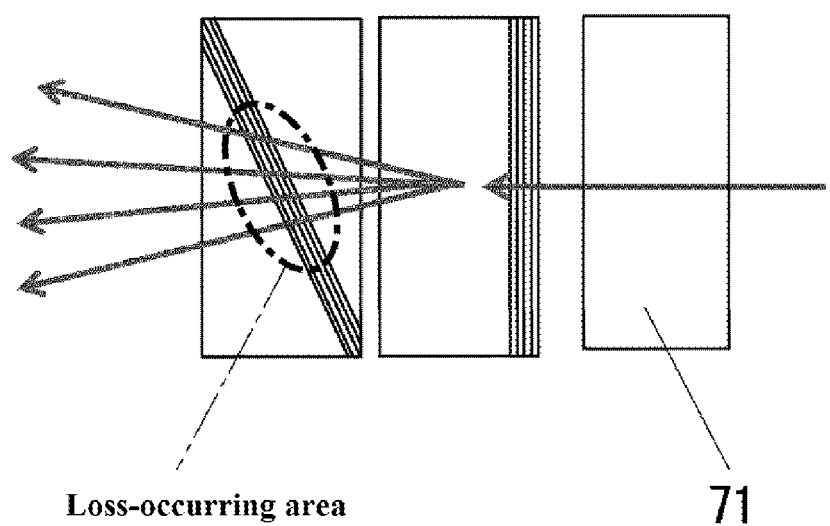
FIG. 18B is a plan view of the light beam digital scanning element in the other embodiment example.
Figure 18C:
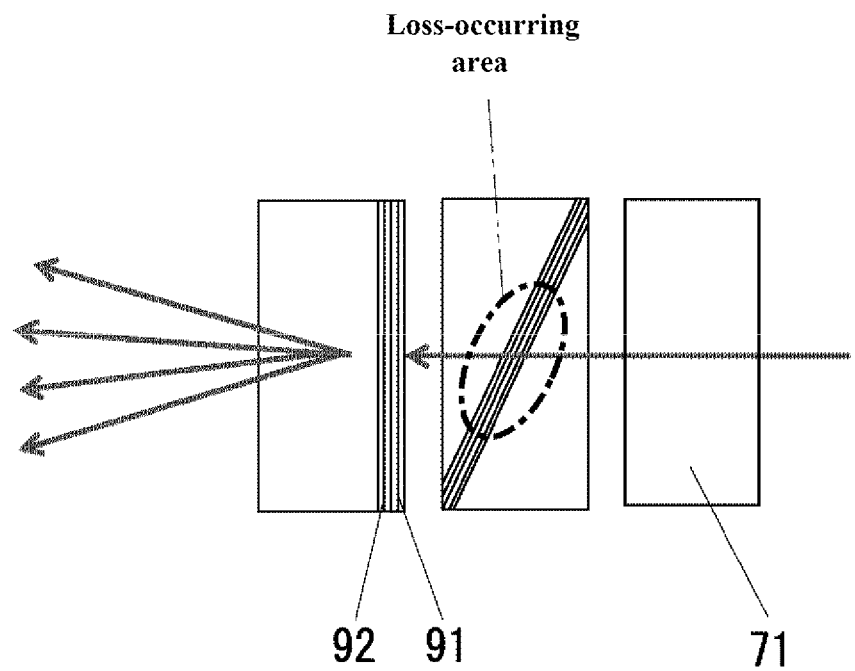
FIG. 18C is a side view of the light beam digital scanning element in the other embodiment example.
Figure 19A:
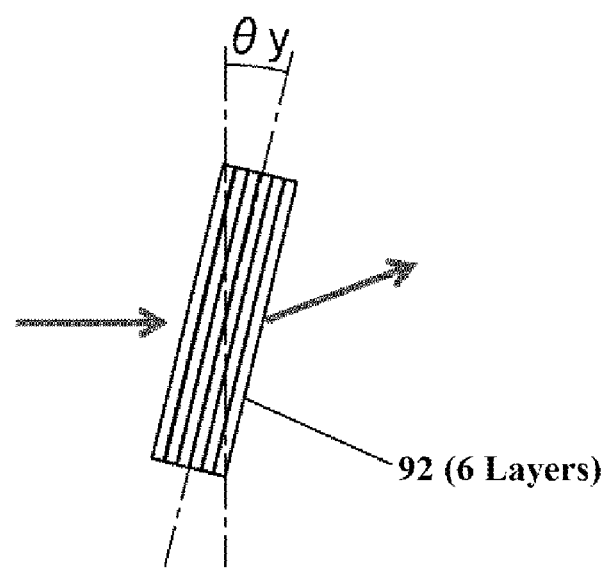
FIG. 19A is a diagram describing an incident angle θy.
Figure 19B:
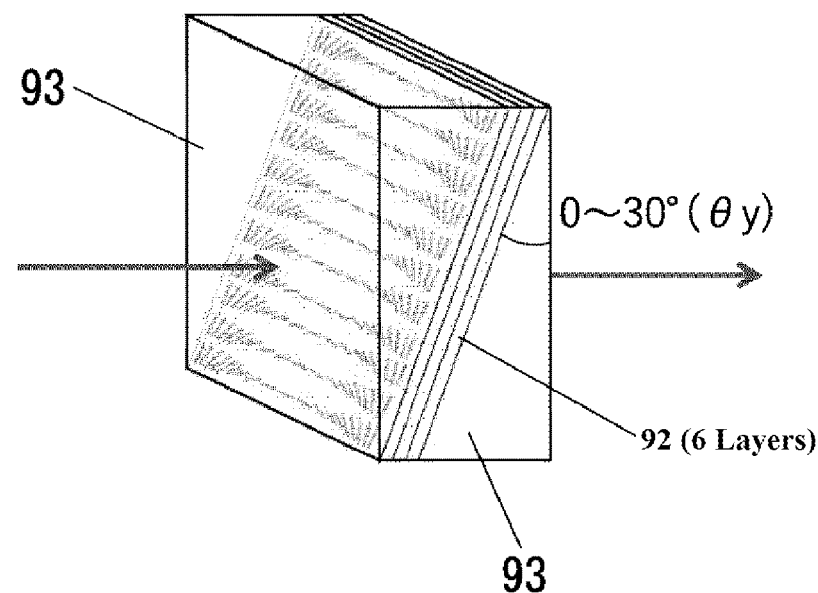
FIG. 19B is a diagram describing an incident angle θy.
Figure 19C:
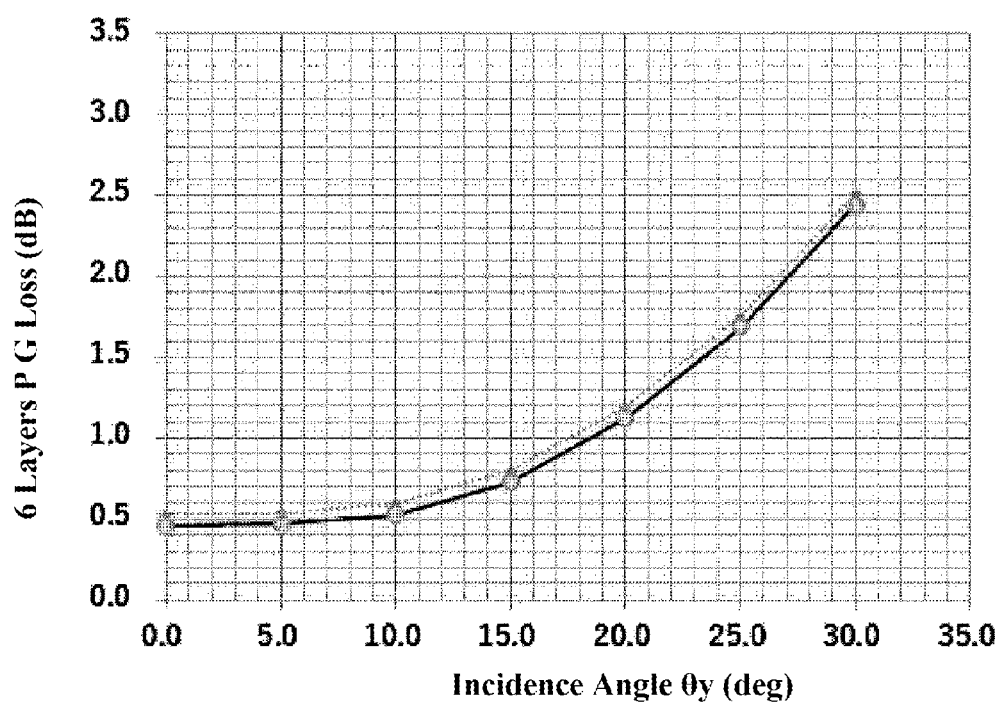
FIG. 19C is a graph showing a relationship example between the incident angle θy and the loss generated.

FIG. 18A-FIG. 18C are diagrams for describing a loss-occurring area when the light beam digital scanning element shown in FIG. 15A-FIG. 15D (or FIG. 17) is used. The example of FIG. 18A-FIG. 18C shows the case where the light beam digital scanning element shown in FIG. 15A-FIG. 15D is used, as one example. FIG. 18A is a perspective view of the light beam digital scanning element. FIG. 18B is a plan view of the light beam digital scanning element of FIG. 18A viewed from the direction indicated by an arrow (A). FIG. 18C is a side view of the light beam digital scanning element of FIG. 18A viewed from the direction indicated by an arrow (B). When a light beam enters the polarization grating 92 diagonally, a loss occurs in the loss-occurring area surrounded by a dashed-dotted line in FIG. 18B and FIG. 18C. FIG. 19A-FIG. 19C are diagrams describing the relationship between an incident angle θy and the loss when six polarization gratings 92 are stacked for measurement. FIG. 19C is a graph showing the loss measured when the incident angle θy depicted in FIG. 19A and FIG. 19B was changed from 0° to 30°. For the incident angle θy of about 10°, almost no loss occurs, but as the angle is further increased, the loss increases. In order to drive the polarization switch 91 made of the blue phase liquid crystal at a low voltage, the incident angle needs to be large, but there is a tradeoff between the incident angle and the loss.

Figure 20A:
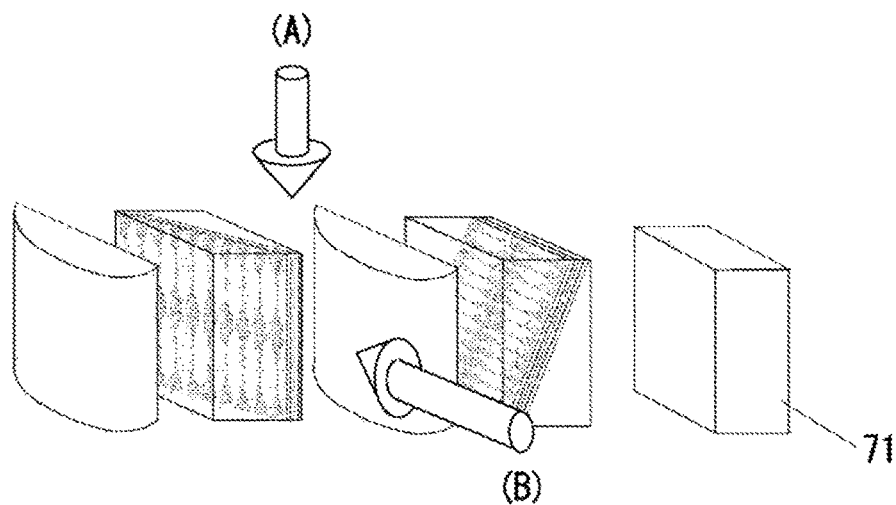
FIG. 20A is a perspective view of a light beam digital scanning element in another embodiment example.
Figure 20B:
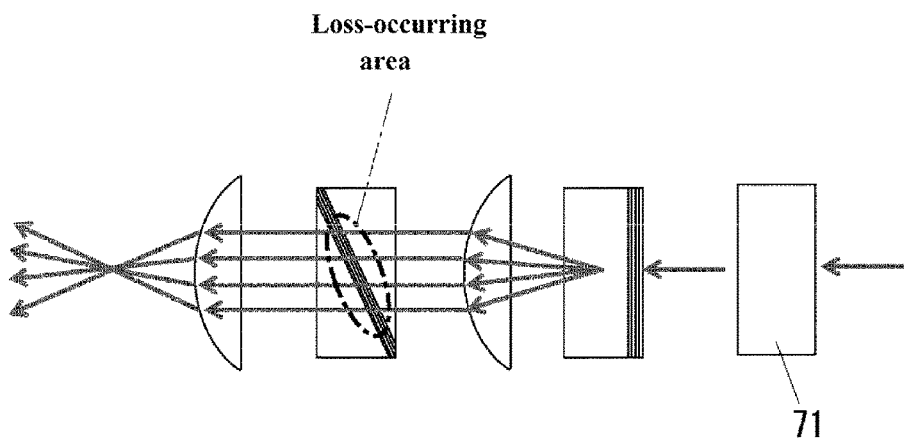
FIG. 20B is a plan view of the light beam digital scanning element in the other embodiment example.
Figure 20C:
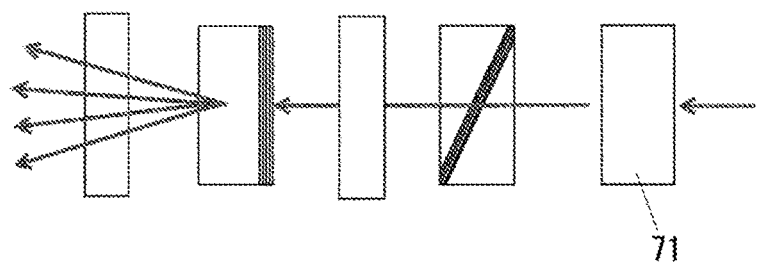
FIG. 20C is a side view of the light beam digital scanning element in the other embodiment example.

FIG. 20A-FIG. 20C are diagrams describing a configuration example of a light beam digital scanning element capable of reducing the loss of the loss-occurring area in the latter stage. FIG. 20A is a perspective view of the light beam digital scanning element. FIG. 20B is a plan view of the light beam digital scanning element of FIG. 20A viewed from the direction indicated by an arrow (A). FIG. 20C is a side view of the light beam digital scanning element of FIG. 20A viewed from the direction indicated by an arrow (B). In the light beam digital scanning element illustrated in FIG. 20A-FIG. 20C, each light beam become parallel among one another in the latter stage, and thus, an almost uniform loss may be realized for each light beam.

Figure 21A:
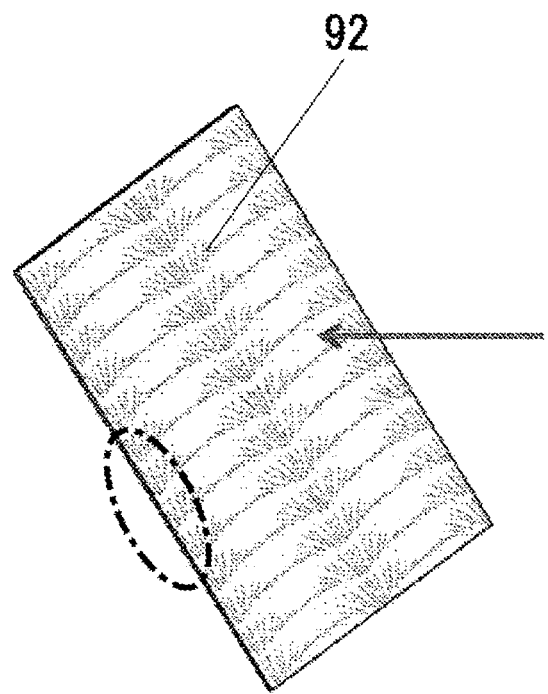
FIG. 21A is a diagram showing one example of a polarization grating 92 in another embodiment example.
Figure 21B:
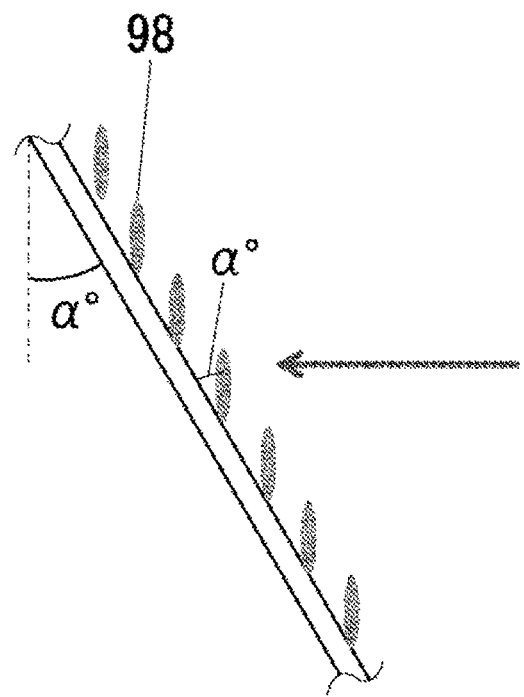
FIG. 21B is an enlarged view of the structure of a part of the polarization grating in the other embodiment example.

FIG. 21A and FIG. 21B show one example of a novel polarization grating capable of suppressing the loss when light beams enter diagonally. FIG. 21A is a diagram showing the appearance of the polarization gratings 92 of the present example. FIG. 21B is an enlarged view of an area enclosed by a dashed-dotted line in FIG. 21A. As shown in FIG. 21B, by diagonally)(a° orienting liquid crystal directors 98 constituting the polarization grating 92, even when the light beam is incident diagonally, it is incident perpendicularly to the liquid crystal directors 98 to thereby allow suppression of the loss.

INDUSTRIAL APPLICABILITY

The present invention may be utilized for Lidar used for lane control and collision prevention for self-driving cars on highways and surface streets; and a self-driving car system and a driver operation support system using the Lidar.

DESCRIPTION OF THE REFERENCE NUMBERS

1: Semiconductor laser
2: Lens
3: Light receiving element
4: Beam splitter
5: Object
6: Light beam
7: Reflected light
8: MEMS mirror
9: Light pulse
10: Light pulse
11: Light spot
12: Traffic light
13: Background (sky)
14: Vehicle in front
15: Oncoming vehicle
16: Half-wave plate
17: Phase plate
20: Optical frequency modulator
24: Square waves
25: Square waves with chirped frequency (frequency is changed linearly over time)
26: Return square waves of 25
31: Single-mode optical fiber
32: Light beam
41: Beam splitter for mixing
71: Circular polarization-type polarization diversity element 90: Light beam digital scanning element (Area B)
91: Polarization switching element
92: Polarization grating
93: Wedge block
94: Basic unit
95: Blue phase liquid crystal
96: Plate electrode
97: Transparent electrode
98: Liquid crystal directors
100: Area A
101: Single-mode optical fiber
102: Polarized beam splitter
107: Polarization rotation element
201: Basic unit (Y-direction)
202: Basic unit (X-direction)
216: Quarter-wave plate

What is claimed is:

1. A polarized-light output device for converting a light beam having a spot diameter, incident from a light source, into light having a specific polarization state and outputting the light, comprising:

first and second polarization gratings disposed with a predetermined spacing therebetween, wherein each polarization grating is oriented along a direction transverse to the incident light beam, comprises a plurality of birefringent directors, and is configured to convert left-handed and right-handed circular polarizations associated with the light beam into reverse circular polarizations, respectively; and a half-wave plate disposed subsequently to the first and second polarization gratings and configured to reverse one of the circular polarizations, wherein the plurality of birefringent directors of each polarization grating are configured to rotate at a predetermined period along a rotation axis that extends on a planer direction of the polarization grating, the first polarization grating is configured to receive and deflect the incident light beam to generate in separate directions a first light beam with the left-handed circular polarization and a second light beam with a right-handed circular polarization, the second polarization grating is configured to receive and deflect the first and second light beams to generate in parallel third and fourth light beams, and the half-wave plate is oriented along a direction transverse to the parallel third and fourth light beams, and configured to receive the third light beam and convert the direction of the circular polarization associated with the third light beam into the same direction as the circular polarization associated with the fourth light beam, whereby the third light beam with the converted circular polarization and the fourth light beam are outputted.

2. A scanner device for light scanning using the polarized-light output device of claim 1, comprising:

the polarized-light output device disposed to receive an incident light beam; and a plurality of basic units stacked in series along a direction of the incident light beam and disposed subsequently to the polarized-light output device, the basic unit comprising a polarization grating configured to be generally the same as the polarization grating included in the polarized-light output device and a polarization switching element configured to switch a direction of a circular polarization of a light beam passing therethrough, wherein the predetermined period of rotation associated with the polarization grating in each basic unit is varied to control deflection angles of the light beam passing the polarization gratings.

3. The scanner device of claim 2, wherein the polarization switching element comprises a polymer-stabilized blue phase liquid crystal sandwiched by two plate electrodes, wherein a position of the light beam is controlled by turning on and off a voltage applied to the polarization switching element.

4. The scanner device of claim 3, wherein the basic unit further comprises two wedge blocks with a high refractive index disposed on both sides of the polarization switching element in a point-symmetrical manner, wherein the polarization grating is disposed on a surface of the wedge block at the output side of the light beam passing the basic unit.

5. A Lidar system using the scanner device of claim 4, comprising:

a light source comprising a semiconductor laser;

a lens configured to convert an incident light beam from the light source to collimated light;

a beam splitter disposed to receive the collimated light and configured to split the collimated light into a first light beam and a second light beam;

the scanner device disposed to receive the first light beam and configured to process the first light beam and emit an output light beam for irradiating an object;

at least one light receiving element disposed to receive the second light beam; and a signal processing and control section coupled to the scanner device for processing and controlling signals, wherein the scanner device is further configured to receive reflected light from the object, and the signal processing and control section is configured to calculate a distance between the scanner device and the object based on the second light beam and the reflected light.

6. The scanner device of claim 3, wherein the basic block comprises the polarization switching element and the polarization grating disposed thereto on a surface at the output side of the light beam, and two wedge blocks with a high refractive index are disposed in a point-symmetrical manner on both sides of a plurality of basic units stacked in series to have an inclined surface of each wedge block in contact with the side of the plurality of basic units and have an exposed surface of each wedge block oriented along a direction transverse to the incident light beam.

7. A Lidar system using the scanner device of claim 6, comprising:

a light source comprising a semiconductor laser;

a lens configured to convert an incident light beam from the light source to collimated light;

a beam splitter disposed to receive the collimated light and configured to split the collimated light into a first light beam and a second light beam;

the scanner device disposed to receive the first light beam and configured to process the first light beam and emit an output light beam for irradiating an object;

at least one light receiving element disposed to receive the second light beam; and a signal processing and control section coupled to the scanner device for processing and controlling signals, wherein the scanner device is further configured to receive reflected light from the object, and the signal processing and control section is configured to calculate a distance between the scanner device and the object based on the second light beam and the reflected light.

8. A Lidar system using the scanner device of claim 3, comprising:

a light source comprising a semiconductor laser;

a lens configured to convert an incident light beam from the light source to collimated light;

a beam splitter disposed to receive the collimated light and configured to split the collimated light into a first light beam and a second light beam;

the scanner device disposed to receive the first light beam and configured to process the first light beam and emit an output light beam for irradiating an object;

at least one light receiving element disposed to receive the second light beam; and a signal processing and control section coupled to the scanner device for processing and controlling signals, wherein the scanner device is further configured to receive reflected light from the object, and the signal processing and control section is configured to calculate a distance between the scanner device and the object based on the second light beam and the reflected light.

9. The Lidar system of claim 8, wherein the incident light beam from the light source comprises continuous short light pulses, and the signal processing and control section is configured to calculate a distance between the scanner device and the object based on a time difference between the time when the second light beam is received at the at least one light receiving element and the time when the reflected light is received at the at least one light receiving element.

10. The Lidar system of claim 9, wherein the light source, the at least one light receiving element, and the scanner device are coupled by a single-mode optical fiber and a single-mode optical fiber coupler.

11. The Lidar system of claim 10, wherein a first area including the light source, the at least one light receiving element, and the signal processing and control section and a second area including the scanner area are coupled by the single-mode optical fiber.

12. The Lidar system of claim 11, wherein a position of the output light beam for irradiating an object is controlled by turning on and off a voltage applied to the polarization switching element of the scanner device to perform weighted digital scanning from an arbitrary point to another arbitrary point at an arbitrary frequency in an arbitrary pattern.

13. The Lidar system of claim 9, wherein a position of the output light beam for irradiating an object is controlled by turning on and off a voltage applied to the polarization switching element of the scanner device to perform weighted digital scanning from an arbitrary point to another arbitrary point at an arbitrary frequency in an arbitrary pattern.

14. The Lidar system of claim 10, wherein a position of the output light beam for irradiating an object is controlled by turning on and off a voltage applied to the polarization switching element of the scanner device to perform weighted digital scanning from an arbitrary point to another arbitrary point at an arbitrary frequency in an arbitrary pattern.

15. The Lidar system of claim 8, further comprising an optical frequency modulator disposed between the light source and the beam splitter, wherein the optical frequency modulator is configured to convert the incident light beam from the light source to light having square waves with chirped frequencies that increase or decrease linearly over time, and the signal processing and control section is configured to calculate a distance between the scanner device and the object based on a beat frequency of beat signals, which are generated by mixing at the at least one light receiving element the light having square waves and the reflected light having square waves.

16. The Lidar system of claim 15, wherein the light source, the at least one light receiving element, and the scanner device are coupled by a single-mode optical fiber and a single-mode optical fiber coupler.

17. The Lidar system of claim 16, wherein a first area including the light source, the at least one light receiving element, and the signal processing and control section and a second area including the scanner area are coupled by the single-mode optical fiber.

18. The Lidar system of claim 15, wherein a position of the output light beam for irradiating an object is controlled by turning on and off a voltage applied to the polarization switching element of the scanner device to perform weighted digital scanning from an arbitrary point to another arbitrary point at an arbitrary frequency in an arbitrary pattern.

19. The Lidar system of claim 8, wherein a position of the output light beam for irradiating an object is controlled by turning on and off a voltage applied to the polarization switching element of the scanner device to perform weighted digital scanning from an arbitrary point to another arbitrary point at an arbitrary frequency in an arbitrary pattern.

* * * * *